United States Patent
Igarashi et al.

(10) Patent No.: US 7,424,538 B2
(45) Date of Patent: Sep. 9, 2008

(54) SERVICE CONTROL NETWORK SYSTEM

(75) Inventors: Yoichiro Igarashi, Kawasaki (JP);
Masaaki Takase, Kawasaki (JP);
Mitsuaki Kakemizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 892 days.

(21) Appl. No.: 10/715,873

(22) Filed: Nov. 17, 2003

(65) Prior Publication Data

US 2004/0111521 A1 Jun. 10, 2004

(30) Foreign Application Priority Data

Nov. 19, 2002 (JP) ............................. 2002-334485

(51) Int. Cl.
*G06F 15/16* (2006.01)
*H04Q 7/20* (2006.01)

(52) U.S. Cl. .................. 709/227; 709/226; 455/433; 370/352

(58) Field of Classification Search ................. 709/225, 709/226, 242; 370/352; 707/10
See application file for complete search history.

(56) References Cited

U.S. PATENT DOCUMENTS

| 5,742,905 | A | 4/1998 | Pepe et al. |
| 6,282,281 | B1 * | 8/2001 | Low ............................ 379/230 |
| 6,418,441 | B1 * | 7/2002 | Call ............................. 707/10 |
| 7,012,916 | B2 * | 3/2006 | Low et al. .................... 370/352 |
| 7,089,325 | B1 * | 8/2006 | Murtza et al. ................. 709/242 |
| 7,225,272 | B2 * | 5/2007 | Kelley et al. ................. 709/245 |
| 2002/0006133 | A1 | 1/2002 | Kakemizo et al. |
| 2004/0024872 | A1 * | 2/2004 | Kelley et al. ................. 709/225 |

FOREIGN PATENT DOCUMENTS

| EP | 1 089 580 | 4/2001 |
| EP | 1 128 632 A2 | 8/2001 |
| JP | 8-256367 | 10/1996 |
| JP | 2001-169341 | 6/2001 |
| WO | WO00/19326 | 4/2000 |

OTHER PUBLICATIONS

F. Shen et al. Profile-Based Subscriber Service Provisioning. IEEE Apr. 15, 2002 pp. 561-574.
European Search Report dated Jul. 1, 2004.
Japanese Office Action mailed Nov. 13, 2007, from the corresponding Japanese Application/Khanh Dinh/ (Jun. 18, 2008).
Yoichiro Igarashi, et al. "Unified IP service control architecture (EaseNet) applicable to IPv6 networks" Technical Report of ICICE, Sep. 6, 2001, pp. 1-6.

* cited by examiner

*Primary Examiner*—Khanh Dinh
(74) *Attorney, Agent, or Firm*—Katten Muchin Rosenman LLP

(57) ABSTRACT

To provide a service customized for each user and for each application, when user host terminal H1 communicates with user host terminal H2 using VoIP, the terminal H1 transmits a service initiation message to service execution units SN1 and SN2. By this message, the service execution unit SN1 and SN2 require service information L-SPC (A) and service information G-SPC (A), both information regards to VoIP service of the term H1, to authentication server A1 respectively. The service execution unit SN1 and SN2 execute a service based on L-SPC (A) and G-SPC (A) respectively. Doing this, service execution unit may provide a service customized for each user and for each application.

7 Claims, 17 Drawing Sheets

FIG. 2A

AN EXAMPLE OF L-SPC

| ITEM | NAME | CONTRACT CONDITION | COMMENT |
|---|---|---|---|
| 1 | DATA COMPRESSION (CONNECTION SITE NOT SPECIFIED) | COMPRESS DATA IF HTTP | EXECUTED BY A SOURCE OF TRANSFER FOR CONTROLLING AT PROTOCOL LEVEL |
| 2 | IP TELEPHONE CHARGE DISCOUNT (TELEPHONE COMPANY NOT SPECIFIED) | INSERT 15 SECONDS VOICE CM BEFORE START | TELEPHONE CHARGE IS DISCOUNTED BECAUSE OF INSERTION OF SPONSOR CM |
| 3 | E-COMMERCE (Business to Consumer) | APPLY UNCONDITIONARY SSL (PACKET ENCRYPTION) TO SITE | THERE EXIST MANY SITES HAVING THE SAME KIND OF CONDITION |

FIG. 2B

AN EXAMPLE OF GLOBAL SPC

| ITEM | NAME | CONTRACT CONDITION | COMMENT |
|---|---|---|---|
| 1 | STREAMING SERVICE PROVIDED BY COMPANY A | INSERT 30 SECONDS CM BEFORE BROADCAST | TELEPHONE CHARGE IS DISCOUNTED BECAUSE OF INSERTION OF SPONSOR CM |
| 2 | IP TELEPHONE | TELEPHONE CHARGE IS DISCOUNTED IF A CERTAIN TELEPHONE COMPANY IS SPECIFIED | DEFINED IN G-SPC BECAUSE DESTINATION TELEPHONE COMPANY ONLY IS REFERRED TO |
| 3 | E-COMMERCE (Business to Consumer) | PROVIDE A DESIGNATED SPECIFIC ENCRYPTION SYSTEM WITH A CERTAIN SITE | A CASE PROVIDING A SPECIFIC FUNCTION OF A SITE |

THE L-SPC REQUEST MESSAGE TRANSMISSION PROCESSING BY THE APPLICATION AUTHENTICATION MODULE

THE G-SPC REQUEST MESSAGE TRANSMISSION PROCESSING BY THE APPLICATION AUTHENTICATION MODULE

FIG. 6A

G-SPC/L-SPC REQUEST MESSAGE

| IP/TCP/UDP PACKET HEADER | MESSAGE TYPE CODE | HOST ID INFORMATION 1 (IP ADDRESS) | HOST ID INFORMATION 2 (NAI) |
|---|---|---|---|

FIG. 6B

G-SPC/L-SPC RESPONSE MESSAGE

| IP/TCP/UDP PACKET HEADER | MESSAGE TYPE CODE | HOST ID INFORMATION 1 (IP ADDRESS INCLUDED IN REQUEST MESSAGE) | HOST ID INFORMATION 2 (NAI INCLUDED IN REQUEST MESSAGE) | SEARCHED SPC (L-SPC/G-SPC) | RETURN CODE |
|---|---|---|---|---|---|

L-SPC/G-SPC RESPONSE MESSAGE RECEPTION PROCESSING
BY THE APPLICATION AUTHENTICATION MODULE

FIG. 8

MAIN SPC TABLE

| USER NUMBER | BASIC CONTRACT INFORMATION | L-SPC POINTER | G-SPC POINTER |
|---|---|---|---|
| 000001 | 192.168.1.1 | 0x343232 | 0x343232 |
| 000002 | 192.168.1.2 | 0x234234 | 0x234234 |
| 000003 | 192.168.1.3 | 0x115764 | 0x115764 |
| 000004 | 192.168.1.4 | 0x723411 | 0x723411 |
| 000005 | 192.168.1.5 | 0x098712 | 0x098712 |
| 000006 | 192.168.1.6 | 0x561218 | 0x561218 |
| 000007 | 192.168.1.7 | 0x131981 | 0x131981 |
| 000256 | 192.168.1.255 | 0x971341 | 0x971341 |

L-SPC TABLE PROVIDED FOR EACH USER (USER NUMBER 00001)

| SPC NUMBER | CONDITION 1 (PORT NUMBER) | CONDITION 2 (HOST ADDRESS) | SPC CONTENT |
|---|---|---|---|
| 1 | 80(HTTP) | EXTERNAL DOMAIN | APPLY ACCESS FILTER |
| 2 | XXX(VoIP-SIP) | NOT SPECIFIED | 5% DISCOUNT OF TOLL CALL CHARGE |

S-SPC TABLE PROVIDED FOR EACH USER (USER NUMBER 00001)

| SPC NUMBER | CONDITION 1 (PORT NUMBER) | CONDITION 2 (HOST ADDRESS) | SPC CONTENT |
|---|---|---|---|
| 1 | 80(HTTP) | 12.123.124.255 | CONTENTS CONVERSION (TRANSLATION) |
| 2 | 25(SMTP) | 15.67.23.21 | MAIL VIRUS CHECK |
| 3 | XXX(VoIP-SIP) | 23.45.56.223 | AD DISTRIBUTION TO USER HOST TERMINAL |

SERVICE CONTROL NETWORK SYSTEM

FIELD OF THE INVENTION

The present invention generally relates to a service control network system, and more particularly a service control network system capable of providing for each user a service on an application-by-application basis. Also, the present invention relates to a server managing service information in the service control network system and a service execution unit providing the service for a terminal unit.

BACKGROUND OF THE INVENTION

As a conventional technique for providing a communication service customized for each user, there has been disclosed a method for reducing the load of a service control program in a service control unit caused by transferring the information between service control units, by reducing an amount of individual user information to be maintained in the service control program. (For example, refer to the patent document 1.)

Also, there has been disclosed a method for providing a service customized for each user based on a processing policy provided in a service control unit which stores each user's condition and the processing policy set for individual users having the opposite user requesting for communication with a user, a condition of the user requested, and a process corresponding to a request content. (For example, refer to the patent document 2.)

Meanwhile, in recent years, there has been proposed a concept of Policy-Based Networking (PBN), which is a framework for controlling an IP network. In the PBN, a policy server sets network operation policies into a network apparatuses. By referring to the policies, the network apparatuses perform network services so as to meet QoS (Quality of Services) requirement, etc.

However, in view of setting a policy in each mobile terminal (user), it is required to set the policy to the entire apparatuses having possibilities of accommodating such a mobile terminal, which results in an increased amount of policy setting processing throughout the network. Further, in order to apply the information notified in the PBN to the individual basic services specified by the Mobile IP, etc., it is necessary to make a concrete specification to be applied to each service, as well as studies for implementation.

In order to avoid the aforementioned increase in the amount of policy setting processing, there may be considered a method by the use of a connection authentication procedure or a location registration procedure in a mobile protocol (for example, Mobile IP) performed by a user host terminal against the network. According to such a method, service control information for each user is included in a message transferred between the apparatuses having the host authentication procedure. This service control information is distributed to an edge router (router positioned in the edge zone of a core network). The edge router refers to the acquired service control information, and controls the service behavior based on the acquired service control information.

However, such the service control performed by the edge router is suitable for a service closed within the network layer (the layer three in the OSI reference model, or the IP layer). As compared to the service performed in the above-mentioned layer, a service performed in the layer higher than the layer four, such as the layer seven (or the application layer), has features described below. (Hereinafter the service is referred to as 'high-layer services'.)

Generally, the high-layer services is not dependent on a packet transfer path, etc. Such a service is not always appropriate to be performed in the edge zone of the core network.

Also, in general, it is not possible to identify whether or not the high-layer services is requested at the time of authenticating an access from a user terminal. For example, as for a user who started to use in a public wireless LAN service area, it is not possible to identify whether the user will use the IP telephone service first, or instead, access the Web service.

[Patent Document 1]
The official gazette of Japanese Unexamined Patent Publication Number Hei-8-256367 (pages 3-5, and FIG. 1)

[Patent Document 2]
The PCT Gazette of International Publication Number 00/19326

SUMMARY OF THE INVENTION

The present invention has been invented in consideration of the aforementioned background. It is an object of the present invention to provide a customized higher-layer services on a user-by-use basis, as well as on an application-by-application basis.

In order to achieve the above-mentioned object, a service control network system in accordance with the present invention includes; a service execution unit providing a service to a terminal unit; and a server managing service information specifying the service to be provided to the terminal unit. The service execution unit further includes; a request transmission section transmitting to the server a reference request for the service information corresponding to either a service initiation request or a registration request, on receipt of the service initiation request or the registration request from the terminal unit; and a service provision section providing the service to the terminal unit based on the service information referred to by the reference request transmitted from the request transmission section. Further, the server includes a service information transmission section transmitting to the service execution unit the service information corresponding to the reference request transmitted from the service execution unit.

Further, according to the present invention, the service control network system includes a first domain, a first server accommodated in the first domain, a first service execution unit, and a terminal unit. The first server further includes; a storage section storing first service information specifying a service to be provided to the terminal unit; and a service information transmission section transmitting the first service information stored in the storage section to the first service execution unit based on a reference request for the first service information, on receipt of the reference request from the first service execution unit. The first service execution unit includes; a first request transmission section transmitting a reference request for the first service information corresponding to a service initiation request or a registration request to the first server, on receipt of the service initiation request or the registration request from the terminal unit; and a first service provision section providing the service to the terminal unit based on the first service information referred to by the request transmitted from the first request transmission section.

Still further, according to the present invention, the service control network system includes a first domain accommodating a first server and a terminal unit, and a second domain, to which the terminal unit moves, accommodating a second server and a second service execution unit. The first server includes; a storage section storing first service information specifying a service to be provided to the terminal unit; and a service information transmission section transmitting the first service information stored in the storage section to the second server based on a reference request for the first service information, on receipt of the reference request from the second server. The second service execution unit includes; a second request transmission section transmitting to the second server a reference request for the first service information corresponding to a service initiation request or a registration request, on receipt of the service initiation request or the registration request from the terminal unit; and a second service provision section providing the service to the terminal unit based on the first service information referred to by the request transmitted from the second request transmission section. The second server includes a transfer section transferring to the first server the reference request transmitted from the second request transmission section, and transferring to the second service execution unit the first service information transmitted from the first server.

Here, 'registration request' denotes a request for registration of the existence of a terminal unit with regard to a predetermined service. For example, this includes a request performed by a terminal unit to register the existence of the terminal unit itself against the SIP service in VoIP.

According to the present invention, on receipt of a service initiation request or a registration request from the terminal unit, the service execution unit requests the server for service information (service control information) corresponding to the service initiation request or the registration request. This enables to identify the service the user desires to receive. Also, the service execution unit can acquire the service information corresponding to the identified service. Thus, it becomes possible for the service execution unit to perform a service control corresponding to each user and the service provided to the user.

Further, according to the present invention, the server is accommodated in a first domain formed in a communication network. The server includes; a storage section storing first service information specifying a service to be provided to a terminal unit accommodated in the first domain; a reception section receiving a reference request for the first service information transmitted from a first service execution unit accommodated in the first domain for providing the service to the terminal unit; and a transmission section transmitting the first service information stored in the storage section to the first service execution unit, based on the reference request received by the reception section.

Also, according to the present invention, the server accommodated in a first domain formed in a communication network includes; a storage section storing a first service information specifying a service to be provided to a terminal unit which is accommodated in the first domain and moved into a second domain formed in the communication network; a reception section receiving a reference request for the first service information, which is transmitted from a second service execution unit accommodated in the second domain for providing the service to the terminal unit, and transferred by a second server accommodated in the second domain; and a transmission section transmitting the first service information stored in the storage section to the second service execution unit through the second server, based on the reference request received by the reception section.

According to the present invention, the service execution unit is provided in a communication network for providing a service to a terminal unit accessing the communication network. The service execution unit includes; a storage section storing service information specifying the service; a transmission section transmitting a reference request for the service information specifying the service corresponding to a service initiation request or a registration request to a server provided in the communication network for managing the service information, on receipt of the service initiation request or the register request from the terminal unit; a reception section receiving the service information transmitted from the server based on the reference request transmitted from the transmission section, and storing the received service information into the storage section; and a service provision section providing the service to the terminal unit based on the service information stored in the storage section.

Further scopes and features of the present invention will become more apparent by the following description of the embodiments with the accompanied drawings.

BRIEF DESCRIPTION OF THE DRAWINGS

FIG. 2A shows an example of a local SPC.

FIG. 2B shows an example of a global SPC.

FIG. 6A shows a data structure of a G-SPC request message and an L-SPC request message.

FIG. 6B shows a data structure of a G-SPC response message and an L-SPC response message.

FIG. 8 shows examples of a main SPC table, an L-SPC table and a G-SPC table respectively managed by an authentication server.

DETAILED DESCRIPTION OF THE PREFERRED EMBODIMENTS

The preferred embodiment of the present invention is described hereinafter referring to the charts and drawings.

CONFIGURATION EXAMPLE OF SERVICE CONTROL NETWORK SYSTEM

Figure 1:
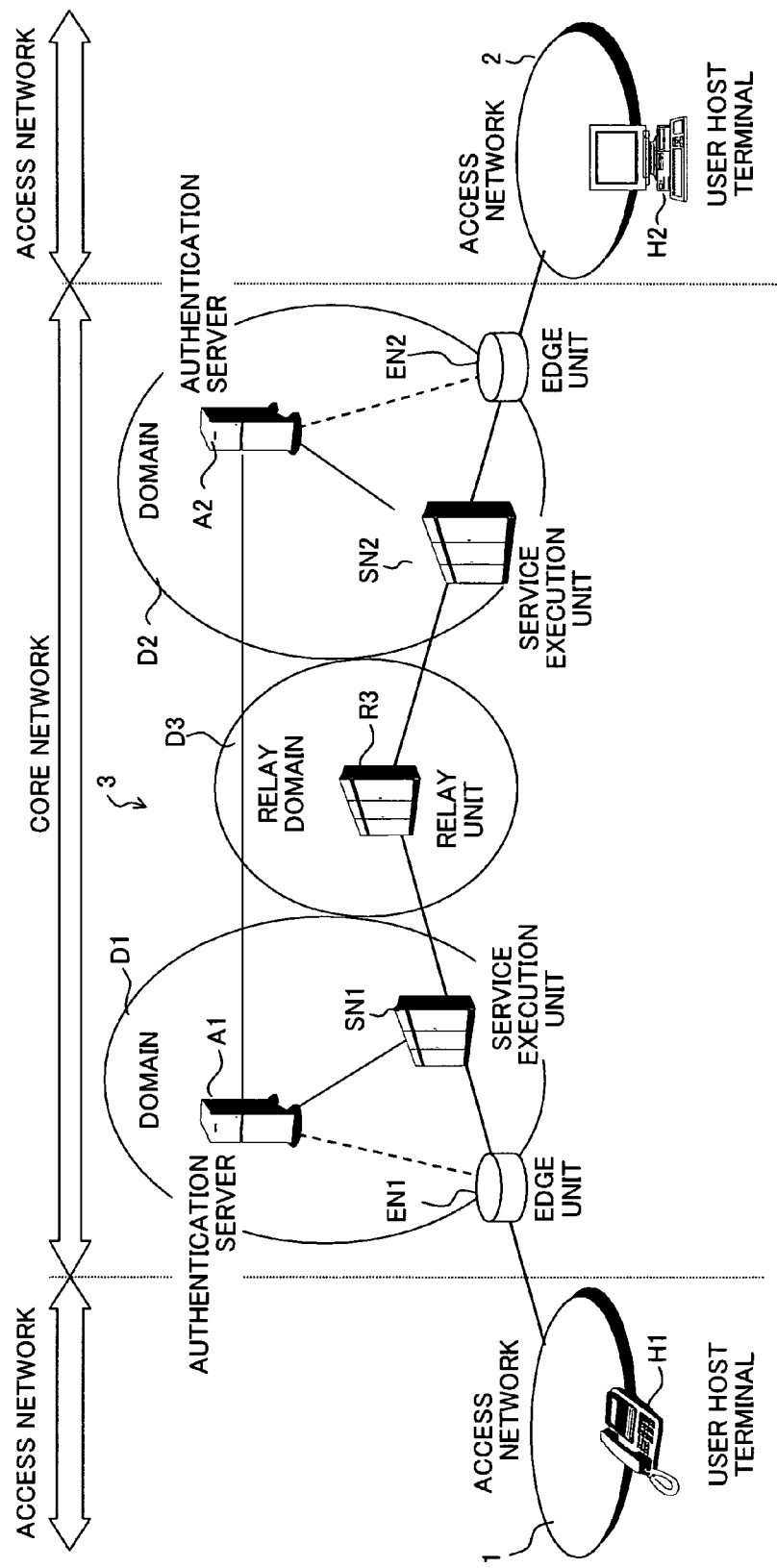
FIG. 1 shows a block diagram illustrating a configuration example of a service control network system according to an embodiment of the present invention.

FIG. 1 shows a block diagram of a configuration example of a service control network system in accordance with an embodiment of the present invention. By way of example, this service control network system is provided with three networks, which are access networks 1, 2, and a core network 3.

Access network 1 is, for example, a LAN, a wireless LAN, or the like, which is accessed by a user host terminal H1 (for example, a personal computer, a telephone set, or a personal computer with a telephone set) operated by the user. Also, access network 2 is, for example, a LAN, a wireless LAN, or the like, accessed by a user host terminal H2 (for example, a personal computer, a telephone set, or a personal computer with a telephone set).

Core network 3 is, for example, the IPv6 Internet. According to the embodiment of the present invention, core network 3 is divided into, for example, three partial networks (domains), which are referred to as domain D1, domain D2, and relay domain D3. In Domain D1, an authentication server A1, an edge unit EN1, and a service execution unit SN1 are provided. In domain D2, an authentication server A2, an edge unit EN2, and a service execution unit SN2 are provided. In relay domain D3, a relay unit (for example, a router) R3 is provided. Additionally, by way of example, there are two domains D1, D2 shown in FIG. 1. Also, one edge unit and one service execution unit are shown in each domain. However, it may also be possible to include more than three domains in the network. Also, more than two edge units, and more than two service execution units as well, may be existent in each domain.

Each authentication server A1, A2 is, for example, an AAA (Authentication, Authorization and Accounting) server, which performs authentication, authorization and accounting functions.

Authentication server A1 is provided in domain D1 for which authentication server A1 is responsible. At the time of access, authentication server A1 authenticates a user host terminal (for example, user host terminal H1) the home link of which is domain D1. Authentication server A1 also retains and manages a Service Profile Cache (SPC), which includes a service contract condition (service information and service control information) to be referred to when a service execution unit (for example, service execution unit SN1) performs a service to the user host terminal of interest. On receipt of an SPC distribution request from the service execution unit, authentication server A1 extracts an SPC maintained therein, and distributes the SPC to the service execution unit originating the request.

Authentication server A2 also authenticates a user host terminal (for example, user host terminal H2) the home link of which is domain D2, for which authentication server A2 is responsible, and retains and manages the SPC for the user host terminal of interest. Upon request from the service execution unit, authentication server A2 distributes the SPC to the service execution unit originating the request.

As will be described later, SPC is provided for each application (service) of each user. Each SPC is further divided into a Local SPC and a Global SPC, which are retained in authentication servers A1, A2. Because the SPC is provided for each application of each user, it becomes possible to provide the users with services customized on both an application by application basis and a user-by-user basis.

Service execution units SN1, SN2 are units executing a variety of services. Each service execution unit SN1, SN2 is a session control server (SIP server, where 'SIP' denotes session initiation protocol) providing an IP telephone function (Voice-over-IP, or simply VoIP), any variety of Web servers, etc. In this embodiment, an application authentication module, which will be described later, is mounted on such a server providing the general services.

Edge units EN1, EN2 are network units located on the edges of each domain D1, D2. For example, edge units EN1, EN2 are edge routers respectively located at the boundary between domain D1 and an external access network 1, and the boundary between domain D2 and an external access network 2.

User host terminals H1, H2 are terminal units each receiving a service based on a contract condition settled by each host. Domain D1 is a home link (home network) of user host terminal H1, and domain D2 is a home link (home network) of user host terminal H2. Accordingly, authentication server A1 retains and manages the SPC (Local SPC and Global SPC) for user host terminal H1, and authentication server A2 retains and manages the SPC for user host terminal H2.

Each user host terminal H1, H2 may have a client function, etc. related to the service provided by each service execution unit SN1, SN2. For example, when VoIP is used, telephoning software controlling the SIP. (Session Initiation Protocol), etc. are installed in each user host terminal

Contents of SPC

As described earlier, each authentication server A1, A2 retains and manages the SPC for each user host terminal (user). The SPC is a data set in which service behaviors required for controlling a service for use by each contract user (contract user host terminal) are described. By the use of this SPC, it becomes possible to provide an individual service for each user. The SPC is classified into a Local SPC (hereafter referred to as L-SPC.) and a Global SPC (hereafter referred to as G-SPC), and managed accordingly.

(1) Contents of L-SPC

L-SPC is an SPC referred to by the service execution unit existent in the same domain as the domain accommodating the contract user host terminal (home link of the contract user host terminal). For example, in FIG. 1, the L-SPC retained in authentication server A1 accommodated in domain D1 is referred to by service execution unit SN1 accommodated in the same domain D1.

Because the L-SPC is referred to within the same domain as the domain accommodating the host requesting for a service, the L-SPC describes such conditions as commonly applicable to each service, which are not dependent on the service execution unit. For example, the L-SPC includes a port number, protocol information, etc.

Also, the service described in the L-SPC is such a service that is identifiable to execute when a packet is originated from the user host terminal concerned. For example, the service corresponds to a service which is initiated based on a certain protocol type, not depending on a particular ASP (Application Service Provider). Namely, the service corresponds to a case of providing a common added value using a function of the present invention to a streaming broadcast service provided by a site.

The L-SPC in the service execution unit is referred to as a decision condition for execution, together with the G-SPC in the opposite user host terminal. Namely, the L-SPC is referred to as an execution condition when an individual service according to the contract condition is provided to the user host terminal originating the service request (packet).

FIG. 2A is an example of the L-SPC. In this figure, item 1 denotes, in case of an information service by HTTP (Hypertext Transfer Protocol) without specifying a site, data to be transmitted from the service execution unit to the user host terminal is compressed. Also, item 2 denotes, in case of IP telephone (VoIP) without specifying a telephone operating company, a voice commercial message (CM) is forwarded to the user host terminal before the start of communication, and the telephone charge of the user host terminal is discounted because of this CM insertion.

(2) Contents of G-SPC

G-SPC is an SPC referred to by a service execution unit existent in the domain which is different from the domain accommodating a contract user host terminal. For example, in FIG. 1, the G-SPC retained in authentication server A1 accommodated in domain D1 is referred to by service execution unit SN2. The contents of the G-SPC describe behavior of respective individual services.

A service type specified in the G-SPC describes control content for each site providing an application. As a typical example, in case of a streaming service, a particular service is specified in the G-SPC when the service for particular information (for example, for music program only) is to be specified.

FIG. 2B shows an example of the G-SPC. As compared with FIG. 2A, it will easily be understood that the site is not specified in FIG. 2A, the site is specified in FIG. 2B, as a streaming site of a company A. For example, in item 1, when receiving a service from the streaming site company A, a commercial message is broadcasted for 30 seconds before the start of the broadcast. With this, the user host terminal can receive the reduction of the service charge.

<Distribution Method of L-SPC>

Next, a method for distributing the L-SPC from the authentication server to the service execution unit is described below.

The L-SPC is an SPC related to a service executed in the service execution unit provided in the domain directly accommodating the user host terminal (home link of the user host terminal). The L-SPC must be distributed at the same time as the application execution.

With regard to the L-SPC distribution method, the following two methods are applicable: a method of distributing at the time of the service registration, prior to the service execution; and a method of sequentially distributing at the time of the service execution. These methods are described below in detail.

(1) Distribution at the Time of Service Registration

In some IP services, service execution authorization is registered into the service execution unit when the location of a user host terminal into a particular domain (sub network) is registered, or the access authentication is received, separately from registering each time the service is initiated. For example, in the SIP for performing VoIP session control, a user host terminal registers its own existence into a neighboring SIP server by use of a 'Register' message.

This Register message is effective during the period as long as the user host terminal stays in the domain concerned. In the case that the contents of the L-SPC is not changed frequently for a certain period, the service execution unit requests the authentication server authenticating the user host terminal concerned to transmit the L-SPC of the user host terminal originating the request, at the time of the registration prior to the use of the service. In reply to this request, the authentication server distributes the L-SPC to the service execution unit in a reply message. The distributed L-SPC is then stored in the service execution unit.

The L-SPC distributed to and stored in the service execution unit is deleted when the L-SPC becomes unnecessary because the user host terminal moves outside, or the like. The service execution unit manages the validity period necessary for the management of deletion, etc., using a management table for managing the validity period of the Register message related to the user host terminal. In such a way, providing a management mechanism proper to the L-SPC becomes unnecessary.

Namely, the Register message registers to use the SIP performed by a service execution unit while the user host terminal is located near this service execution unit. On a certain condition such as the user host terminal having moved outside, the service execution unit determines the retention period is ended, and deletes the registered information. Meanwhile, because the L-SPC is used within the valid period of the Register message, such an action as deletion of a useless L-SPC can be operated in combination with a management table of the Register message. This makes it unnecessary to provide a management mechanism proper to the L-SPC in the service execution unit.

Thus, by performing the L-SPC management in the service execution unit in combination with the Register message management, a proper L-SPC management mechanism becomes unnecessary, which enables the load reduction of the service execution unit.

The timing for triggering the service execution unit to request the authentication server for the L-SPC can be synchronized with the aforementioned registration operation into the service registration table. In the following description, by way of example, a case that the service execution unit is an SIP server is shown. A user host terminal transmits a first Register message to the SIP server located nearest to the user host terminal. When registering the user host terminal concerned into a user host terminal information table provided in the SIP server, the SIP server requests the authentication server for the L-SPC of the user host terminal concerned. The SIP server then receives the L-SPC from the authentication server, and stores the received L-SPC.

(2) Successive Distribution at the Time of Service Execution

The aforementioned distribution method performed at the time of service registration is applicable when the service execution unit has, as a service feature, a function of user host terminal registration (authentication) prior to the use of the service. This method is suitable when modification of the SPC is infrequent.

In contrast, there is another method for the L-SPC distribution applicable when a service has no registration procedure to the service execution unit (for example, SIP server and Web server) with regard to the service registration (such as a service to be executed each time on receipt of a request). In such a case, the L-SPC is distributed successively at the time of service execution.

In this successive distribution, when the service execution unit receives a service request (such as an HTTP request message) from a user host terminal, it is required for the service execution unit to identify that the received message is a first request message (a first within a certain past period) from the user host terminal originating the request.

For this purpose, the service execution unit retains and manages a service use condition management table, and refers to this table. When the information related to the user host terminal originating the request message is not existent in this service use condition management table, the service execution unit recognizes that the message concerned is a first request message. The service execution unit then request the L-SPC to the authentication server located in the domain of the user host terminal originating the request. Thereafter, the service execution unit stores the L-SPC, which is included in the response message transmitted from the authentication server, into the service use condition management table.

Further, the service execution unit monitors the service use condition management table at certain intervals, and deletes user host terminal registration information the retention of which has elapsed for a certain time. Thus, it becomes possible to reduce a cost (in view of memory capacity, time required for management, etc.) for managing user host terminal information which is not frequently used.

Distribution Method of G-SPC

The distribution of the SPC related to the service of the layer three (network layer, IP layer), such as the QoS (Quality of Services) and the packet filtering, to the edge units may be operated in connection with the procedure of the access authentication or the location registration of the user host terminal.

In contrast, a higher layer application (typically, the layer seven) has a feature that the service execution location differs content by content of the services. For example, service execution units (servers) providing the VoIP service or a variety of Web services are disposed in the network with the optimal locations and numbers. Accordingly, the locations to which the SPC is distributed depend on the service execution units providing the service.

Therefore, with regard to the high layer services, in order to distribute the SPC according to an individual condition on a per contract user host terminal basis, it is necessary to consider an SPC distribution method suitable for individual service execution units locating scattered in the network.

According to the embodiment of the present invention, the G-SPC is distributed to the service execution units in the following way: When a user host terminal having contracted the service transmits a service initiation request message to a service execution unit, the service execution unit requests the authentication server managing both the contract and the authentication information of the user host terminal concerned to send the G-SPC of the user host terminal. The authentication server replies to this request by transmitting a response message including the G-SPC of the user host terminal concerned.

Here, when the domain of the service execution unit is different from the domain of the user host terminal originating the request, the service execution unit requests for the G-SPC an authentication server located in the domain of the user host terminal originating the request, through another authentication server (a local authentication server) located in the domain of the service execution unit.

A sequence of actions through the above mentioned procedure is referred to as 'application authentication' in this embodiment of the present invention, by which the service execution unit obtains the G-SPC of the user host terminal and determines whether the service is to be executed, and which of the service content is to be executed.

As for the services provided under the identical condition, irrespective of a subscriber's contract condition, such an individual service control is not required. The aforementioned application authentication may be applicable when there exists a condition on a contract user by user basis in addition to the common condition.

Application Authentication Function

A variety of service execution units existent in the network employ different execution start timings, and different protocols. Therefore, in order to provide service control according to the embodiment of the present invention, it is necessary to provide a common means so that each service execution unit obtains the L-SPC or the G-SPC of the user host terminal requesting for the service execution.

As such a common means, an application authentication module (which is exemplary comprised of software) is added to the service execution unit according to the embodiment of the present invention (such as SIP server and Web server). The application authentication denotes an acquisition of the G-SPC and a decision operation of service execution content based on the description of the acquired G-SPC.

The application authentication module has an extended AAA client function and a G-SPC management function. Here, the 'extended AAA client function' is provided on the service execution unit side, enabling interactions between the application authentication function and an authentication server (AAA server) so as to obtain the G-SPC of a user host terminal for service control from the authentication server accommodating the user host terminal concerned. Also, the 'G-SPC management function' is provided for retaining the G-SPC of each user host terminal for a certain period.

When executing the service, the service execution unit works according to the G-SPC content.

Hereafter, there will be described an L-SPC request message transmission processing, a G-SPC request message transmission processing, and an L-SPC/G-SPC response message reception processing performed by the application authentication module.

Figure 3:
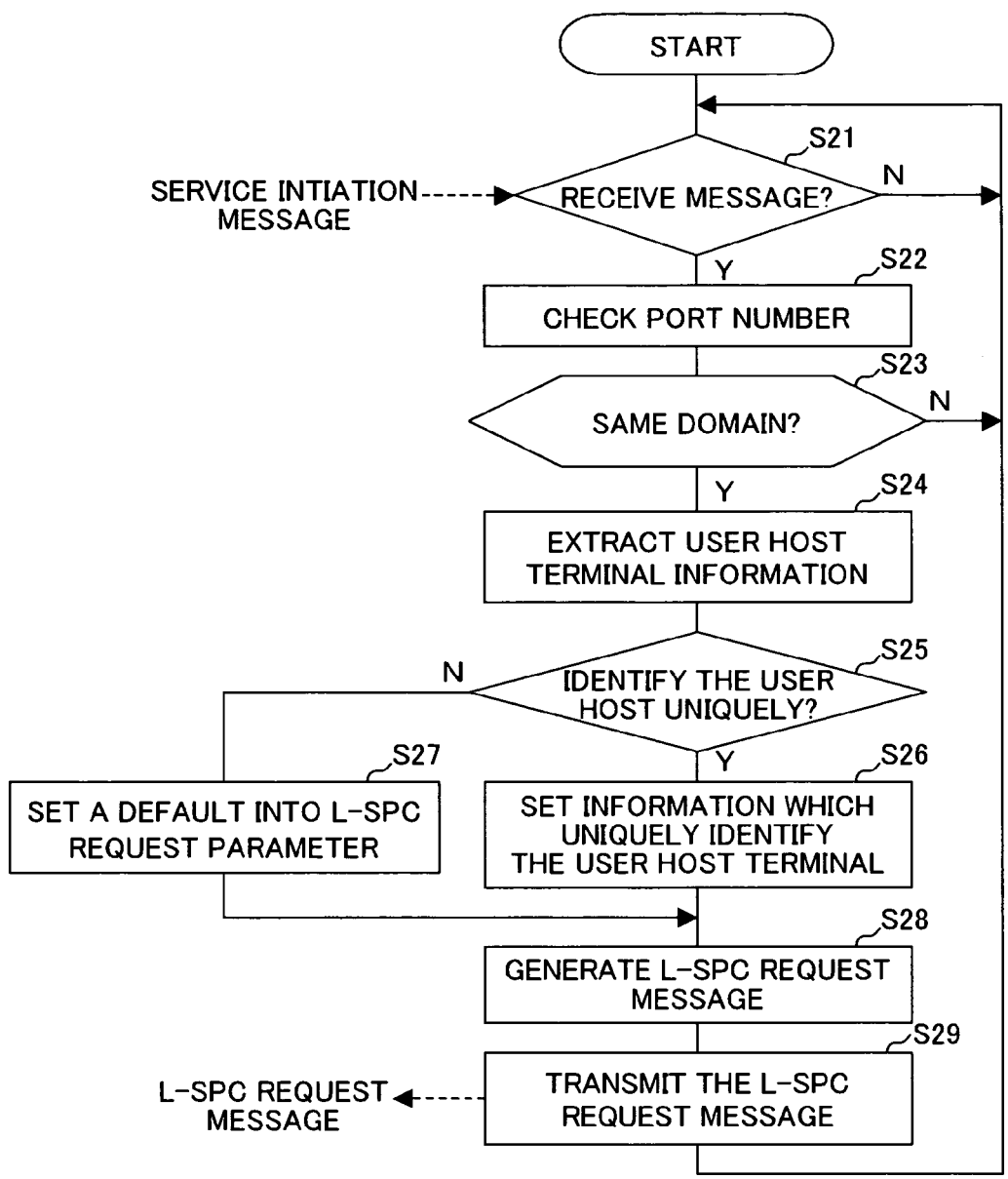
FIG. 3 shows a flowchart illustrating the flow of L-SPC request message processing performed by an application authentication module.

FIG. 3 shows a flowchart illustrating the L-SPC request message transmission processing by the application authentication module.

The application authentication module is in a message reception waiting condition (S21). On receipt of a message (Y in S21), the application authentication module checks the port number of TCP (Transmission Control Protocol) or UDP (User Datagram Protocol) in the message (S22). If this port number is the port number the service execution unit is monitoring, the application authentication module executes the following processing, triggered by this message reception.

First, based on a service initiation message from the user host terminal, the application authentication module decides whether the user host terminal is located in the same domain as the service execution unit concerned (S23). This decision is made by comparing the source address (IP address) of the message with the address (IP address) of the service execution unit.

When the service initiation message is originated in a user host terminal in the same domain (Y in S23), the application authentication module extracts, from the service initiation message, user host terminal information originating the service initiation request (S24). This user host terminal information is at least one of the IP address of the user host terminal (the transmission source address of the service initiation message) and the NAI (Network Access Identifier) of the user host terminal.

On the other hand, when the service initiation message is originated in a user host terminal not in the same domain, the L-SPC is not necessary, and therefore the application authentication module returns to the message reception waiting condition.

Next to the step S24, the application authentication module decides whether the user host terminal can be uniquely identified, based on the extracted user host terminal information (S25). For example, when the service initiation message is transmitted through a proxy server, the address of the user host terminal originating the service request is hidden by the proxy server. In such a case, the request source address becomes the address of the proxy server, and therefore, it is not possible to identify the user host terminal uniquely.

As such, when the user host terminal cannot be identified uniquely (N in S25), the application authentication module sets a predetermined default L-SPC (specified value) into an L-SPC request parameter (S27). On the contrary, when the user host terminal can be identified uniquely (Y in S25), the application authentication module sets information which can uniquely identify the user host terminal into the L-SPC request parameter (S26).

Thereafter, the application authentication module generates an L-SPC request message (S28), and transmits the generated L-SPC request message to the authentication server in the same domain (S29).

After transmitting the L-SPC request message, the application authentication module returns to the message waiting condition (S21).

FIG. 6A shows the data structure of the L-SPC request message (or the G-SPC request message). The L-SPC request message (or the G-SPC request message) includes an IP/TCP/UDP packet header, a message type code, host identification information 1 for service control (for example, the IP address of a user host terminal) and host identification information 2 for service control (for example, the NAI of the user host terminal).

The IP/TCP/UDP packet header includes a port number, by which a particular service (application) is identified. With regard to the SPC of the host terminal (user) identified by either host identification information 1 or host identification information 2, an L-SPC (or G-SPC) related to the service identified by the port number is searched and extracted by the authentication server. Thus, the service execution unit can obtain the SPC on a user-by-user basis, as well as on an application by application basis.

The message type code denotes whether the message of interest is an L-SPC request message or a G-SPC request message. Based on this message type code, the unit on the reception side (here, the authentication server) identifies the message and recognizes whether the L-SPC is to be searched and extracted, or the G-SPC is to be searched and extracted. Host identification information 1 or 2 is the information to be set as an L-SPC request parameter in either step S26 or S27.

Figure 4:
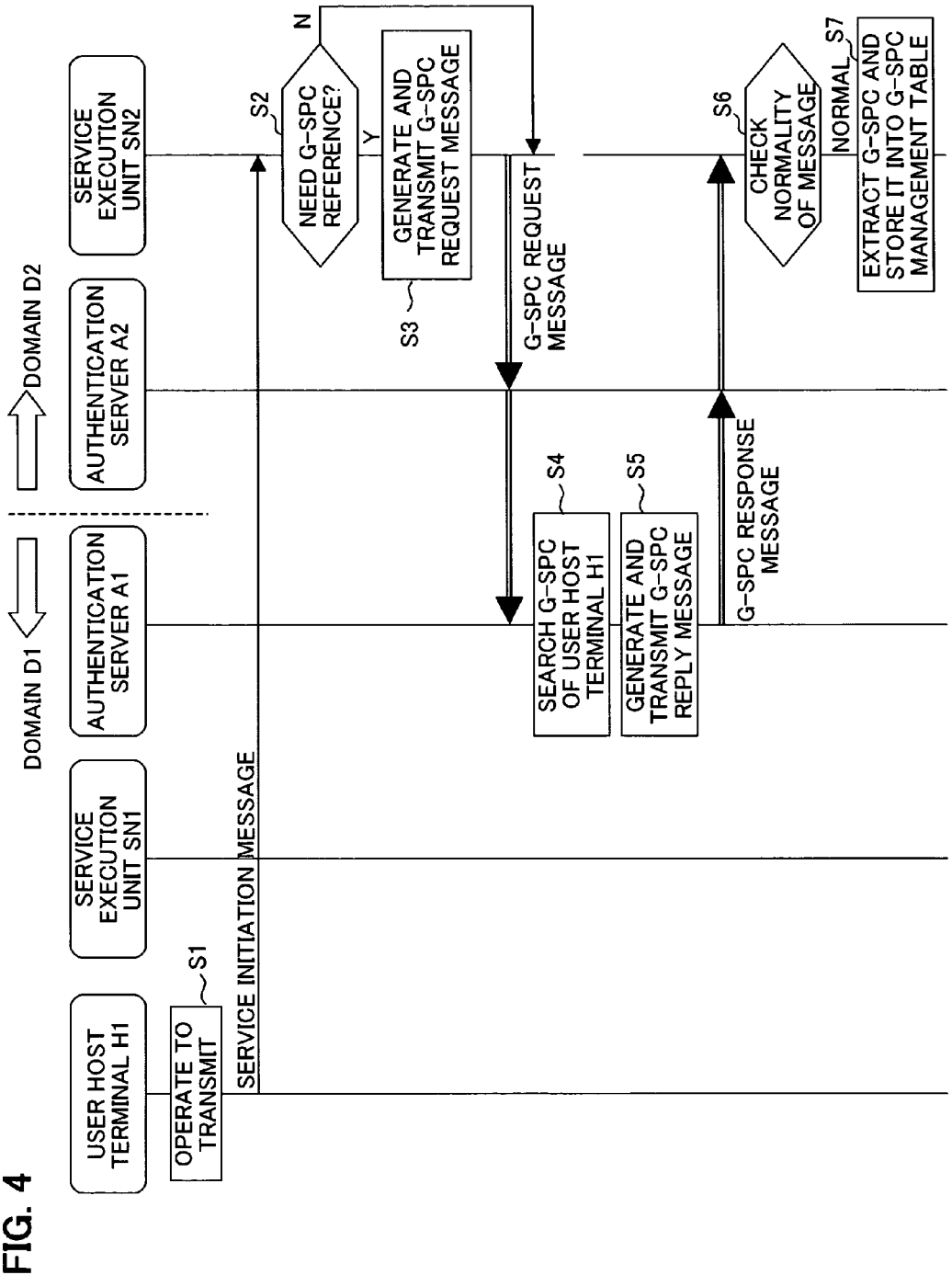
FIG. 4 shows a sequence diagram illustrating the processing flow from the transmission of a service initiation message by a user host terminal to the transmission of a G-SPC request message, and the reception of a G-SPC response message, by a service execution unit.

FIG. 4 shows a sequence diagram illustrating the processing flow from the transmission of a service initiation message by a user terminal to the transmission of a G-SPC request message and the reception of a G-SPC response message by a service execution unit. This diagram illustrates a sequence diagram exemplifying a service control network system shown in FIG. 1.

First, the user operates user host terminal H1 and requests service execution unit SN2 for service, and thereby user host terminal H1 transmits a service initiation message for the service concerned to service execution unit SN2 (S1). This service initiation message is, for example, a message accessing the home page of service execution unit SN2 (Web server).

Here, it may also be possible that this service initiation message is received in service execution unit SN1, and service execution unit SN1 decides the necessity of the L-SPC related to user host terminal H1. And, as a result of this decision, when L-SPC is decided necessary, service execution unit SN1 may request authentication server A1 for the L-SPC and receive the L-SPC therefrom.

On receipt of the service initiation message, service execution unit SN2 decides whether the reference to G-SPC is necessary with regard to the decision whether the service denoted in the service initiation message is necessary (S2). This decision is made based on whether an effective G-SPC (i.e. G-SPC before expiration of the effective period) is stored in service execution unit SN2, and whether it is necessary for service execution unit SN2 to refer to the G-SPC in the user host terminal originating the request at the time of performing the service concerned.

When service execution unit SN2 decides that referring to the G-SPC is necessary (Y in S2), the service execution unit SN2 generates a G-SPC request message for requesting authentication server A2 for the G-SPC of user host terminal H1 requesting the service execution, and transmission the request to authentication server A2 in domain D2 (S3). The G-SPC request message has the data structure previously shown in FIG. 6A.

Authentication server A2 recognizes that user host terminal H1 is accommodated in (and managed by) authentication server A1 (namely, domain D1) from the contents of the G-SPC request message (namely, the IP address or the NAI of user host terminal H1. Refer to FIG. 6A.), and transfers the received G-SPC request message to authentication server A1. Here, both authentication servers have a relation of mutual trust, and each authentication server has the IP address of the other authentication server in advance. The G-SPC request message is transferred based on this IP address of the opposite server.

On receipt of the G-SPC request message, authentication server A1 searches for the G-SPC of the user host terminal H1 (S4). If there exists the G-SPC of user host terminal H1, authentication server A1 generates a G-SPC response message which includes the searched G-SPC, and transmits the response message to service execution unit SN2 originating the request (S5).

FIG. 6B shows the data structure of the G-SPC response message (or the L-SPC response message). The G-SPC response message (or the L-SPC response message) includes an IP/TCP/UDP packet header, a message type code, host identification information 1 (for example, the IP address of user host terminal H1), and host identification information 2 (for example, the NAI of user host terminal H1), a searched SPC, and a return code.

The 'message type code' denotes whether the message of interest is a G-SPC response message or an L-SPC response message. Based on this message type code, the unit on the reception side (service execution unit SN2) identifies the message. The 'searched SPC' is the G-SPC (or the L-SPC ) searched and found by the authentication server. The 'return code' is information related to the message processing result, etc., which has, for example, a value '0' indicative of the search successfully completed, '2' indicative of an SPC corresponding to the request for search not found, and '3' indicative of the SPC included in the message being a default SPC.

Referring back to FIG. 4, this G-SPC response message is transmitted to authentication server A2, and thereafter transferred from authentication server A2 to service execution unit SN2.

On receipt of the G-SPC response message, service execution unit SN2 checks the normality of the G-SPC response message (S6). This normality of the G-SPC response message is checked by whether the G-SPC response message includes a G-SPC. When the G-SPC is included, the G-SPC response message is decided normal.

When the G-SPC response message is decided normal, service execution unit SN2 extracts the G-SPC included in the G-SPC response message, and stores the G-SPC into an SPC management table (S7).

Figure 5:
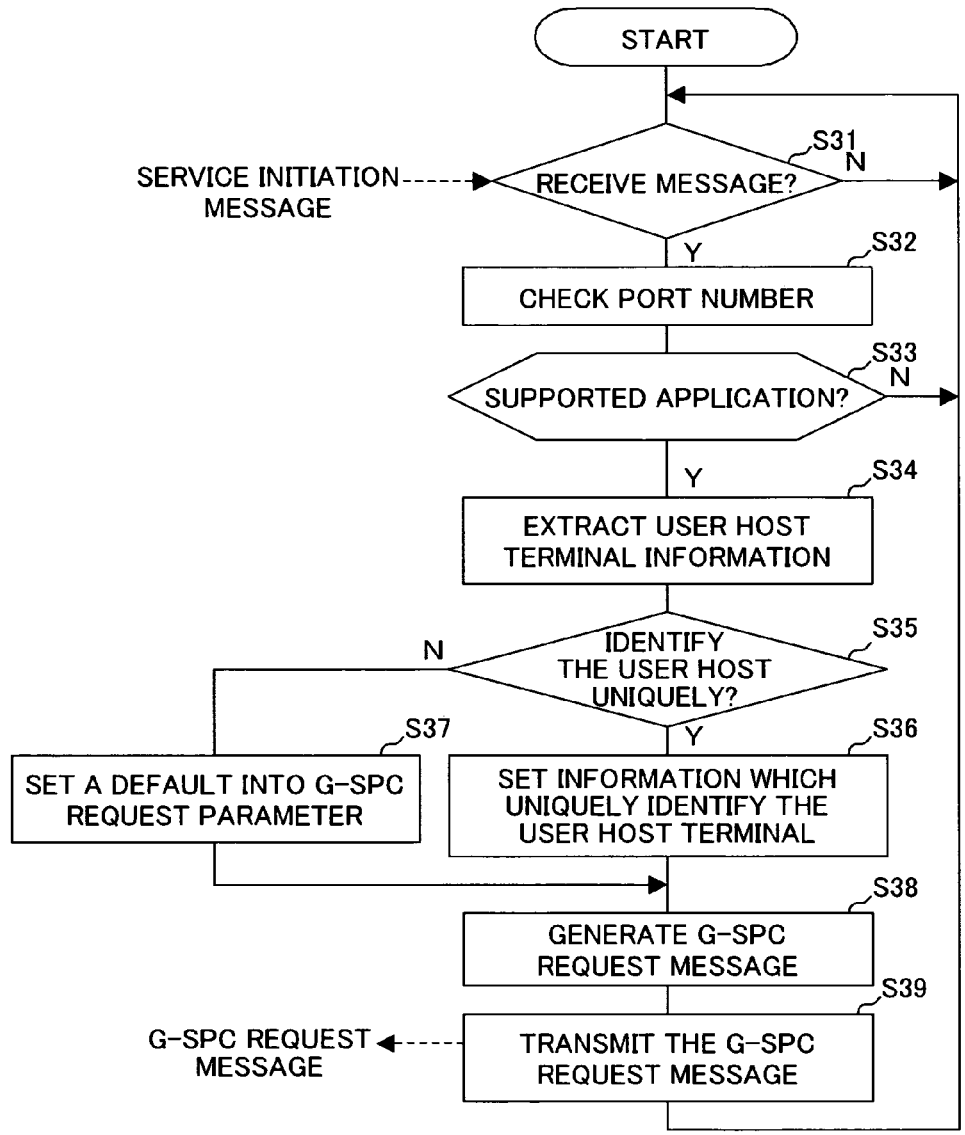
FIG. 5 shows a flowchart illustrating the transmission processing flow of a G-SPC request message performed in an application authentication module.

FIG. 5 shows a flowchart illustrating a transmission processing flow of the G-SPC request message performed by the application authentication module. There is shown a detailed transmission processing (the details of step S3 shown in FIG. 4) of the G-SPC request message performed in service execution unit SN2 (application authentication module).

The application authentication module stays in a message reception waiting condition (S31). On receipt of a message (Y in S31), the application authentication module checks the TCP/UDP port number of the received message (S32). If the port number is a port number to which the service execution unit is monitoring, triggered by this message reception, the following processing is performed.

First, the application authentication module decides whether the application to which the initiation is requested by the service initiation message from the user host terminal is supported (S33). This decision is performed based on the port number, etc. included in the service initiation message.

If the application is supported by the service execution unit (Y in S33), the application authentication module extracts, from the service initiation message, the user host terminal information originating the request for service initiation (S34). This user host terminal information is at least one of the IP address of the user host terminal (the transmission source address of the service initiation message) and the NAI (Network Access Identifier) of the user host terminal.

On the other hand, if the service execution unit does not support the application, the G-SPC is not necessary, and therefore the application authentication module returns to the message reception waiting condition.

Next to the step S34, the application authentication module decides whether the user host terminal can be identified uniquely, based on the extracted user host terminal information (S35). For example, when the service initiation message is transferred through a proxy server, the user host terminal address originating the service request is hidden by the proxy server. In such a case, the request source address becomes the address of the proxy server, and therefore, it is not possible to identify the user host terminal uniquely.

When the user host terminal uniquely cannot be identified uniquely (N in S35), the application authentication module sets a predetermined default G-SPC (specified value, as described later) into a G-SPC request parameter (S37). On the contrary, when the user host terminal can be identified uniquely (Y in S35), the application authentication module sets information which can uniquely identify the user host terminal into the G-SPC request parameter (S36).

Following this, the application authentication module generates a G-SPC request message (S38), and transmits the generated G-SPC request message to the authentication server in the same domain (S39). Thereafter, the application authentication module returns to the message waiting condition.

Figure 7:
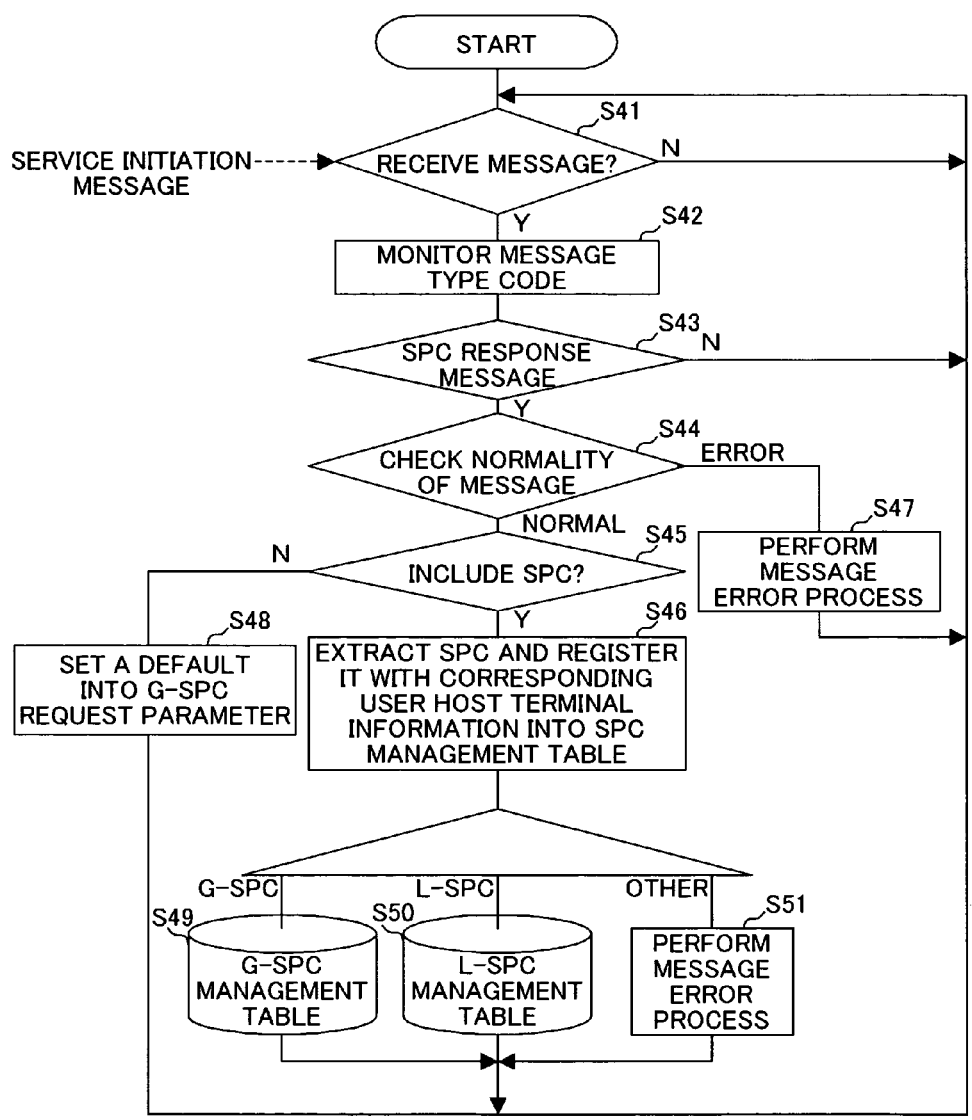
FIG. 7 shows a flowchart illustrating the reception processing flow of a G-SPC response message and an L-SPC response message performed in an application authentication module.

Now, hereafter, a reception processing of the G-SPC response message and the L-SPC response message performed by the application authentication module (service execution unit) is described. FIG. 7 shows a flowchart illustrating the reception processing of the G-SPC response message and the L-SPC response message in the application authentication module.

The application authentication module is in the message waiting condition (S41). Each time a message is received (Y in S41), the application authentication module monitors the message type code of the received message (S42). The message type code is decided based on the message type code shown in FIG. 6B.

When the application authentication module decides that the reception message is an SPC response message (the L-SPC response message or the G-SPC response message) based on the message type code (Y in S43), the application authentication module checks the normality of the message based on the return code (refer to FIG. 6B) (S44). Meanwhile, when the reception message is not an SPC response message, the application authentication module returns to the message waiting condition again (S41).

In the step S43, when the message is decided normal, the application authentication module decides whether the message includes an SPC (L-SPC or G-SPC) (S45).

When the SPC is included (Y in S45), the application authentication module extracts the SPC, and registers the extracted SPC into the SPC management table (S46). Namely, the application authentication module registers the G-SPC in a G-SPC management table, and registers the L-SPC in an L-SPC management table (S49, S50). In other cases, the application authentication module performs a message error processing (S51). Thereafter, the application authentication module returns to the message reception waiting condition (S41).

In the step S45, when the SPC is not included, the application authentication module sets the default G-SPC in the G-SPC request parameter (S48), and thereafter returns to the reception message waiting condition (S41).

In the step S44, when the message is decided abnormal, the application authentication module performs a message error processing (S47), and returns to the reception message waiting condition (S41).

<G-SPC and L-SPC Management Function in Authentication Server>

As having been described earlier, the authentication server (AAA server) retains the individual SPC (L-SPC and G-SPC) of each contract user (user host terminal).

In order to manage the individual SPC of each user, according to the embodiment of the present invention, the authentication server is provided with a main SPC table specifying the L-SPC and G-SPC of each user, an L-SPC table for each user specifying the L-SPC on a user-by-user basis, and a G-SPC table for each user specifying the G-SPC also on a user-by-user basis.

As shown in FIG. 8, the main SPC table includes a user number for identifying each contract user and basic contract information, as the basic information of each user. Also, the main SPC table includes an L-SPC pointer indicative of the pointer to the L-SPC table foe each user, and a G-SPC pointer indicative of the pointer to the G-SPC table for each user.

The L-SPC table provided for each user is a table for managing the L-SPC on a user-by-user basis. In FIG. 8, the L-SPC for a user having the user number 000001 is shown.

The L-SPC table for each user includes SPC number, condition 1 and condition 2 for applying the L-SPC, and SPC content.

The G-SPC table for each user is a table for managing the G-SPC on a user by user basis. In FIG. 8, the G-SPC for the user having the user number 000001 is shown. The G-SPC table for each user includes SPC number, condition 1 and condition 2 for applying the G-SPC, and SPC content.

By managing the SPC using such tables, the authentication server can set and retain a plurality of information sets (search keys) for identifying hosts, on an assumable application by application basis, separately for the G-SPC and the L-SPC.

Here, in the service execution unit, there may be a case that the inherent information of the user host terminal originating the request cannot be acquired because the service execution request originated from the user host terminal is intercepted by an HTTP proxy server, etc. For example, as for an HTTP request transmitted through the HTTP proxy server, the request source information (transmission source address, etc.) is replaced by the information related to the proxy server. Therefore, the address of the user host terminal originating the request cannot be identified.

In such a case, the application authentication function in the service execution unit transmits an SPC request message to the nearest authentication server in a state of 'detailed request source information not available'. On receipt of this message, the nearest authentication server estimates the location of the user host terminal originating the request from the proxy server indicative of the request source information, and returns a G-SPC of a general condition in which a particular user is not identified. Such an SPC is referred to as default SPC.

OPERATION EXAMPLE

Next, typical operation examples of the service control network system are described exemplifying the telephone communication using VoIP.

(1) Operation Example 1

Operation example 1 denotes an example of the execution procedure of the SPC distribution and the individual service control triggered by the application authentication, when user host terminals of the service contract users (both the calling party and the called party of a telephone call) are located in an identical home link, and the service execution unit is existent in the same link as the user host terminals.

Figure 9:
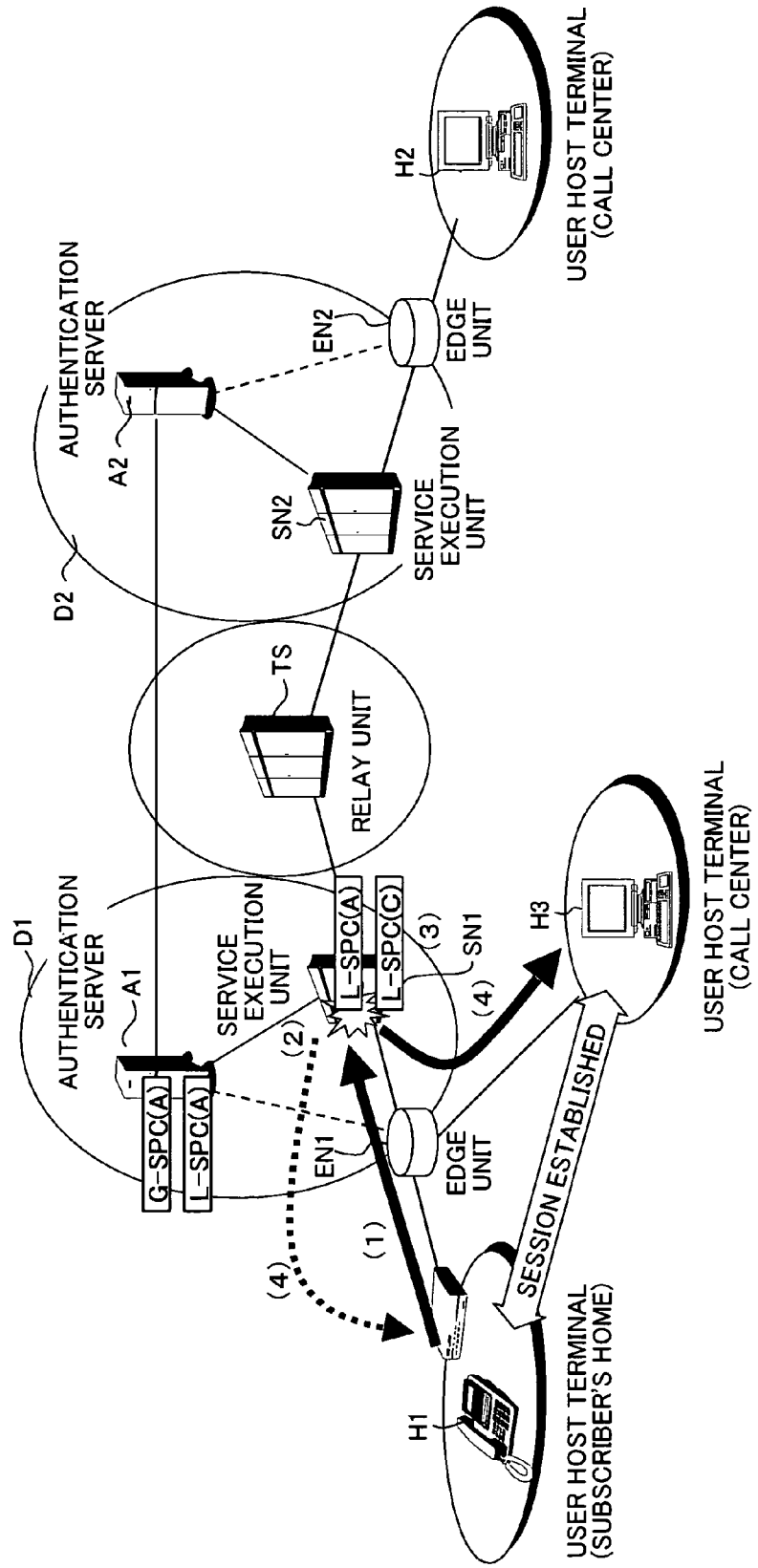
FIG. 9 shows a block diagram illustrating a configuration example of a service control network system in operation example 1.
Figure 10:
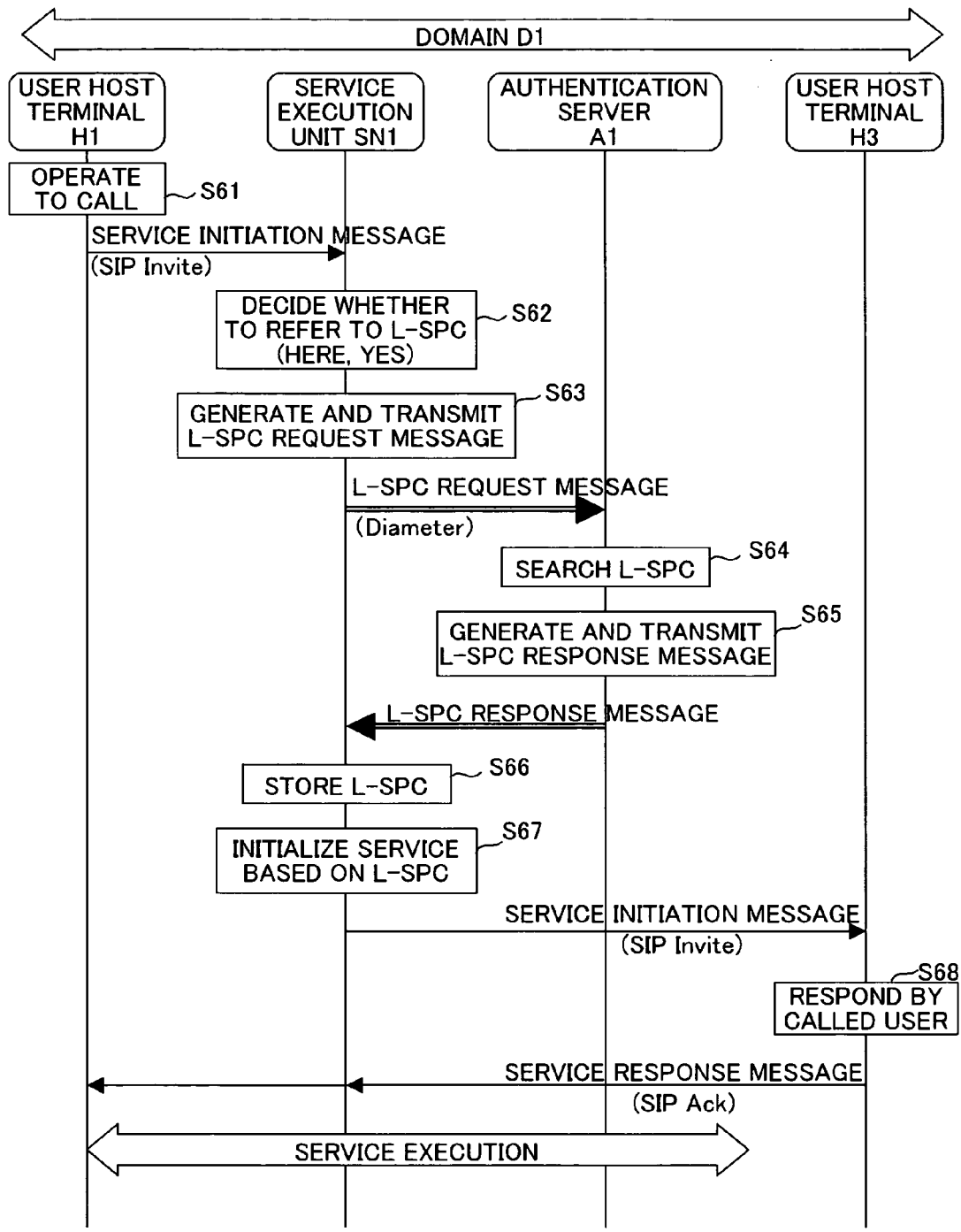
FIG. 10 shows a sequence diagram illustrating the processing flow of a service control network system in operation example 1.

FIG. 9 shows a block diagram illustrating a configuration example of the service control network system in this case. FIG. 10 shows a sequence diagram illustrating a processing flow of the service control network system in this case.

In FIG. 9, user host terminal H1 of the calling party provided in a subscriber's residence, etc. is located in a home link (domain D1). User host terminal H3 of the called party provided in a call center is also located in the identical domain D1. Further, service execution unit SN1 is existent in the identical domain D1, and acquires the L-SPC (L-SPC (A)) of user host terminal H1 and the L-SPC (L-SPC (C)) of user host terminal H3 from authentication server A1 in the domain D1. Additionally, user host terminal H1 and user host terminal H3 are accommodated in an access network.

The user (service contract user) of user host terminal H1 uses the IP telephone function (for example, VoIP software) provided in user host terminal H1, and operates the terminal to originate a call by designating the opposite party (here, user host terminal H3)(S61 in FIG. 10).

Initiated by the user's dial operation, user host terminal H1 generates a service initiation message (session initiation message (SIP-Invite message)) designating the opposite user host terminal H3. User host terminal H1 then transmits the generated service initiation message to the nearest service execution unit (SIP server) SN1 through edge unit EN1 (solid line with arrow (1) in FIG. 9). Because user host terminal H1 recognizes the location (IP address, or the like) of service execution unit SN1 in advance, user host terminal H1 can transmit the service initiation message to service execution unit SN1.

Service execution unit SN1 detects the initiation of the service by receiving the SIP-Invite message from user host terminal H1. Service execution unit SN1 then decides whether it is necessary to request for the L-SPC (A) of user host terminal H1 (a request to authentication server A1) at the time of the service execution (that is, generation of a VoIP session) (symbol (2) in FIG. 9, and S62 in FIG. 10).

As described earlier, when L-SPC (A) is acquired in advance by the Register message, or when the L-SPC (A) having been acquired by the L-SPC request message last time the service is executed is still effective and is not deleted, it is decided that the request for the L-SPC (A) is not necessary. Meanwhile, when the L-SPC (A) is not acquired yet or when the L-SPC (A) once acquired has been deleted because of expiration of the effective period, it is decided that the request for the L-SPC (A) is necessary. In the following description, it is assumed the request for the L-SPC (A) is decided necessary.

With this decision, service execution unit SN1 generates the L-SPC request message, and transmits the generated L-SPC request message to authentication server A1 which manages user host terminal H1 (S63 in FIG. 10). Here, this L-SPC request message is transmitted, for example, by use of Diameter, which is a host authentication protocol.

On receipt of the L-SPC request message related to user host terminal H1 from service execution unit SN1, authentication server A1 searches the database for the L-SPC (A), and extracts the L-SPC (A) therefrom (S64 in FIG. 10).

Authentication server A1 transmits the extracted L-SPC (A) back to service execution unit SN1 having originated the request by use of an L-SPC response message (for example, a Diameter authentication response message) (S65).

Here, when the L-SPC (A) has already been in service execution unit SN1, the processing steps S63 to S65 is omitted.

Service execution unit SN1 then extracts the L-SPC (A) included in the L-SPC response message received from authentication server A1, and stores the extracted L-SPC (A) into the management table owned by the service execution unit SN1 (S66 in FIG. 10), and initializes the service execution function according to the L-SPC description content (symbol (3) in FIG. 9, and S67 in FIG. 10).

Triggered by the setting of L-SPC (A), service execution unit SN1 transfers the service initiation message (SIP-Invite message) to the destination user host terminal H3 (solid line with arrow (4) in FIG. 9).

After transmitting the SIP-Invite message to user host terminal H3, service execution unit SN1 waits for a response from user host terminal H3 (off hook operation of the telephone terminal).

If it is not possible for user host terminal H3 to receive the call because of user host terminal H3 being busy or any other reason, service execution unit SN1 executes a service specified by L-SPC (A) for a period of keeping user host terminal H1 waiting (for example, a service of a voice CM cast for 15 seconds, information service of a waiting time still needed, or the number of people in waiting, etc.), using another communication protocol (broken line with arrow (4) in FIG. 9).

When the user (service contract user) of user host terminal H3 operates the terminal to respond to the connection request from user host terminal H1, user host terminal H3 transmits a service response message (SIP-Ack (acknowledgement) message), triggered by this operation (S68 in FIG. 10).

The SIP-Ack message transmitted from user host terminal H3 is forwarded to user host terminal H1 through service execution unit SN1.

When user host terminal H1 receives the SIP-Ack message from user host terminal H3, the session between user host terminal H1 and user host terminal H3 is established. Thereafter, voice packets are interchanged bi-directionally between these user host terminals, thus the users of the two user host terminals become able to communicate.

Additionally, the L-SPC (C) shown in FIG. 9 is the L-SPC of user host terminal H3, which is transmitted from authentication server A1 to service execution unit SN1 when necessary.

(2) Operation Example 2

Operation example 2 denotes an example of the execution procedure of the SPC distribution and the individual service control triggered by the application authentication, when user host terminals of the service contract users are located in an identical home link, and the service execution unit is existent outside the home link of the user host terminals.

Figure 11:
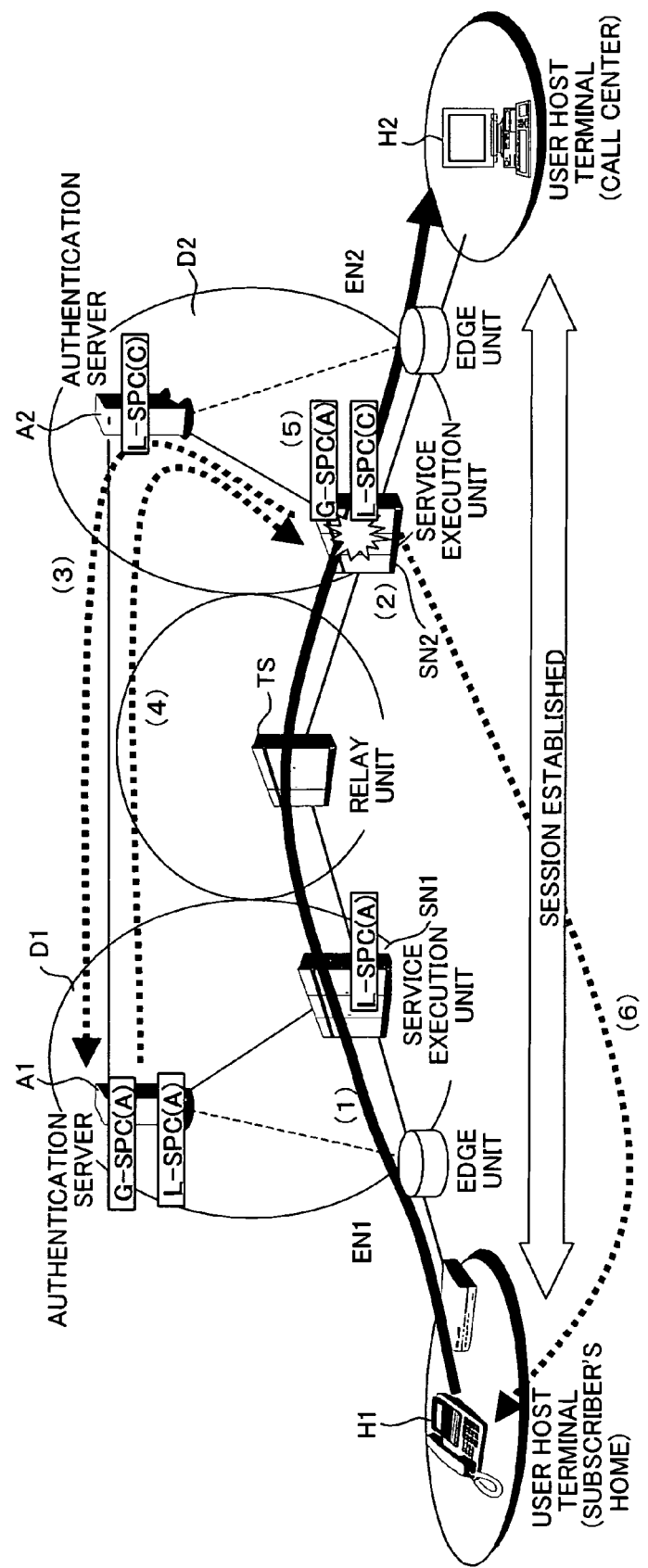
FIG. 11 shows a block diagram illustrating a configuration example of a service control network system in operation example 2.
Figure 12:
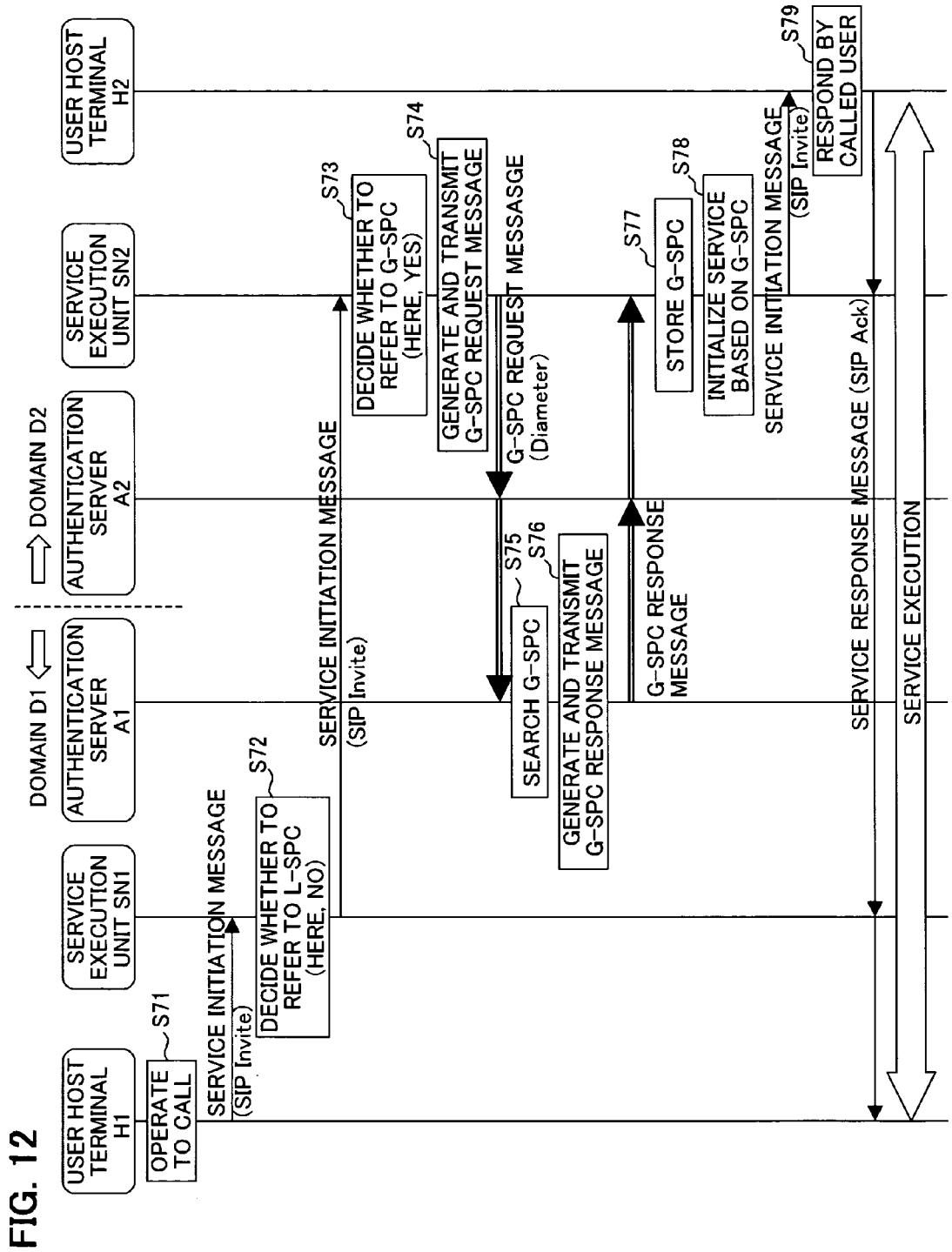
FIG. 12 shows a sequence diagram illustrating the processing flow of a service control network system in operation example 2.

FIG. 11 shows a block diagram illustrating a configuration example of the service control network system in this case. FIG. 12 shows a sequence diagram illustrating a processing flow of the service control network system in this case.

The difference of FIG. 11 from FIG. 9 is that, in FIG. 11, user host terminal H2 of a call center is accommodated in domain D2, which is located outside of domain D1 (home link) of user host terminal H1, and accordingly the service is executed by service execution unit SN2 in domain D2. In such a case, service execution unit SN2 requests authentication server A1 for the G-SPC of user host terminal H1 (which is referred to as G-SPC (A)) necessary for the service execution.

Additionally, in FIG. 11, service execution unit SN1 and service execution unit SN2 are provided in the core network, and a relay unit TS relaying the control protocol from these service execution units is provided in a relay domain. This is based on a case of the VoIP voice communication network having a hierarchical structure similar to the conventional telephone switching system.

The user (service contract user) of user host terminal H1 uses the IP telephone function (for example, VoIP software) of user host terminal H1, and performs a call origination operation designating the opposite party (user host terminal H2) (S71 in FIG. 12).

With this user's dial operation, user host terminal H1 generates a service initiation message (session initiation message, SIP-Invite message) in which the opposite user host terminal H2 is specified, and transmits this message to the nearest service execution unit SN1 (SIP server) (arrow (1) in FIG. 11). User host terminal H1 knows the location (IP address, or the like) of service execution unit SN1 in advance, and therefore user host terminal H1 can transmit the session initiation message to service execution unit SN1.

Receiving the SIP-Invite message from user host terminal H1, service execution unit SN1 detects the service initiation. When executing the service (generation of the VoIP session), service execution unit SN1 decides whether it is necessary to refer to the L-SPC (A) of the calling party, i.e. user host terminal H1 (S72 in FIG. 12). This decision criterion is a control rule the service execution unit owns individually.

Here, it is assumed that the L-SPC (A) has already been acquired by use of a Register message, and that no reference is required. With this decision, service execution unit SN1 does not execute the processing with regard to the acquisition of the L-SPC (A).

Using the ordinary SIP message processing function, service execution unit SN1 transmits the SIP-Invite message to service execution unit (SIP server) SN2, which accommodates the called user host terminal H2, through relay unit TS (arrow (1) in FIG. 11).

On receipt of the SIP-Invite message from service execution unit SN1, service execution unit SN2 recognizes this message as an SIP-Invite message received from the external domain D1. After this, when initiating the service concerned, service execution unit SN2 checks whether it is necessary to refer to the individual service condition of user host terminal H1, namely, the G-SPC of user host terminal H1 (G-SPC (A)) (symbol (2) in FIG. 11, and S73 in FIG. 12). Here, in the following description, it is assumed that reference to the G-SPC (A) is decided necessary.

Based on this decision, service execution unit SN2 generates a G-SPC request message (Diameter message) with regard to user host terminal H1. Service execution unit SN2 then transmits the generated G-SPC request message to authentication server A1 in the home link (domain D1) of the calling user host terminal H1 through authentication server A2 located in the domain D2 of the service execution unit SN2 (broken line with arrow (3) in FIG. 11, and S74 in FIG. 12).

On receipt of the G-SPC request message from service execution unit SN2, authentication server A1 searches the database and extracts the G-SPC (A) therefrom (S75 in FIG. 12).

Next, authentication server A1 transmits the extracted G-SPC (A) back to the service execution unit SN2 originating the request by use of a G-SPC response message (Diameter authentication response message) (broken line with arrow (4) in FIG. 11, and S76 in FIG. 12).

Service execution unit SN2 extracts the G-SPC (A) from the G-SPC response message, and stores the G-SPC (A) into the management table owned by service execution unit SN2 (S77 in FIG. 12). Next, service execution unit SN2 initializes the service execution function according to the description content in G-SPC (A) (symbol (5) in FIG. 11, and S78 in FIG. 12).

Triggered by the G-SPC (A) set in service execution unit SN2, service execution unit SN2 transmits an SIP-Invite message to the called user host terminal H2, and then waits for a response from user host terminal H2 (an off hook operation of the telephone terminal). During waiting for the response, user host terminal H1 receives from service execution unit SN2 a service (broadcast of a CM, information on the waiting time, etc.) according to the G-SPC (A) (broken line with arrow (6) in FIG. 11).

By operating the terminal, the user of user host terminal H2 responds to user host terminal H1 against the connection request from user host terminal H1. By this operation, user host terminal H2 transmits a service response message (SIP-Ack (acknowledgement) message) (S79 in FIG. 12). The SIP-Ack message transmitted from user host terminal H2 is forwarded to user host terminal H1 through service execution unit SN2, relay unit TS, and service execution unit SN1.

When user host terminal H1 receives the SIP-Ack message transmitted from user host terminal H2, the session between user host terminal H1 and user host terminal H2 is established. Thereafter, voice packets are interchanged bi-directionally between the two user host terminals, and the communication proceeds.

Additionally, the L-SPC (C) shown in FIG. 11 is the L-SPC of user host terminal H2, which is transmitted from authentication server A2 to service execution unit SN2 when necessary.

(3) Operation Example 3

Operation example 3 denotes an example of the execution procedure of the SPC distribution and the individual service control triggered by the application authentication, when a user host terminal of the service contract user moved out of the home link into another link (domain), and a service execution unit is existent in the local link.

Figure 13:
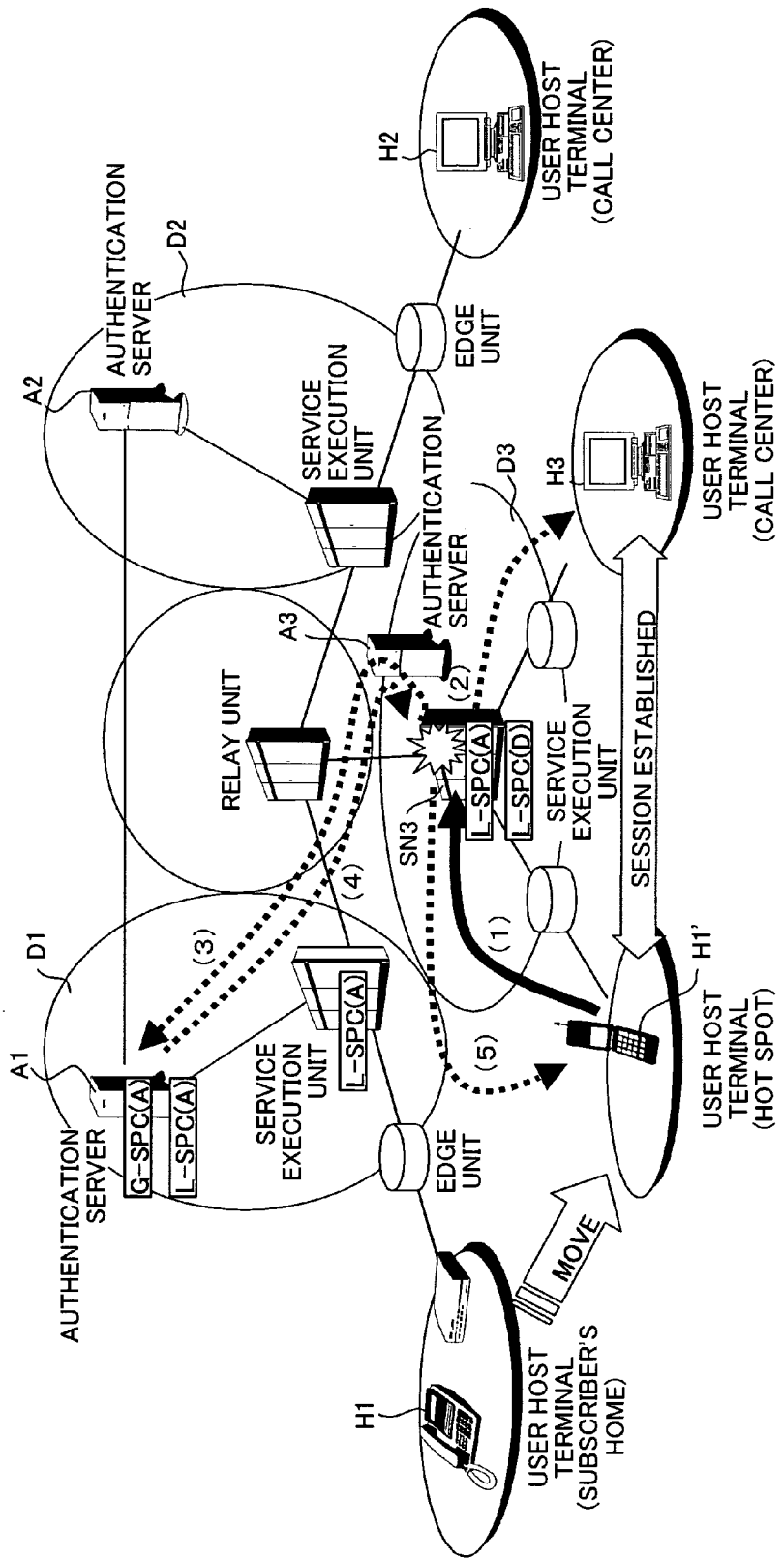
FIG. 13 shows a block diagram illustrating a configuration example of a service control network system in operation example 3.
Figure 14:
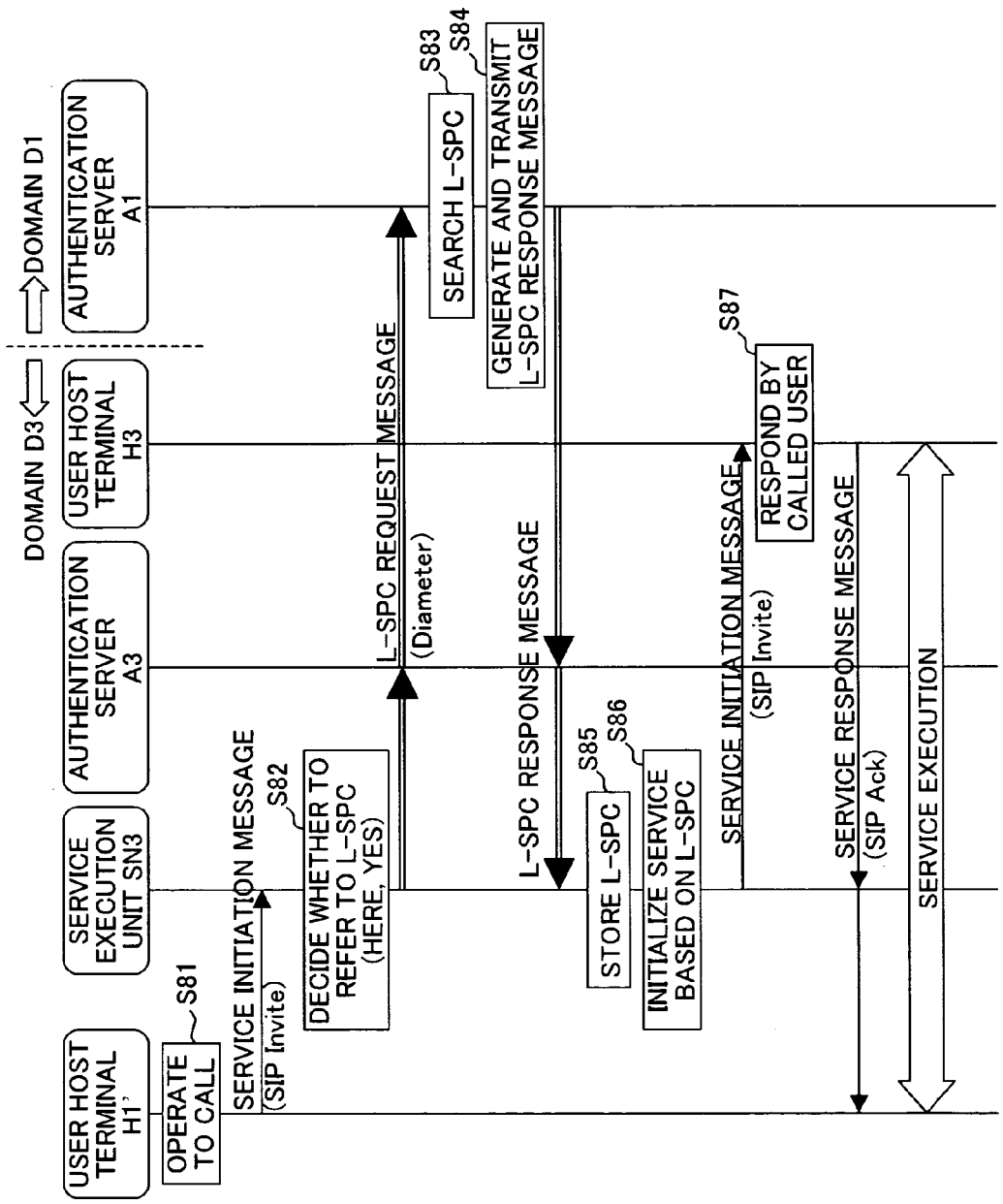
FIG. 14 shows a sequence diagram illustrating the processing flow of a service control network system in operation example 3.

FIG. 13 shows a block diagram illustrating a configuration example of the service control network system in this case. FIG. 14 shows a sequence diagram illustrating a processing flow of the service control network system in this case.

In FIG. 13, there is shown a case that the user (service contract user) of user host terminal H1 who was communicating with a fixed line at the subscriber's residence moves to a temporary access network (for example, a wireless LAN hot spot) provided by the same network operating agency, and initiating a call from this point to user host terminal H3 provided in a call center. The user of user host terminal H1 uses a user host terminal H1' (for example, a portable telephone) at the location the user moves to. However, both of the user host terminals (i.e. user host terminal H1 and user host terminal H1') are used by the same service contractor, and therefore the service provided for both user host terminals H1, H1' is specified by the same L-SPC (L-SPC (A)) or the same G-SPC (G-SPC (A)). Also, the temporary access network, user host terminal H1', and user host terminal H3 are accommodated in a domain D3. Domain D3 includes an authentication server A3 and a service execution unit SN3.

First, the user (service contract user) of user host terminal H1' operates the IP telephone function of the terminal to originate a call by designating the opposite party for communication (i.e. user host terminal H3).

Initiated by the user's dial operation, user host terminal H1' generates a service initiation message (SIP-Invite message) designating user host terminal H3 on the opposite party, and transmits the generated service initiation message to the nearest service execution unit (SIP server) SN3 (arrow (1) in FIG. 13, and S81 in FIG. 14). User host terminal H1' recognizes the location of the nearest SIP server in advance, and thereby the service initiation message is transmitted to service execution unit SN3.

The SIP-Invite message transmitted from user host terminal H1' is received in service execution unit SN3. When executing the service concerned (generation of a VoIP session), service execution unit SN3 decides it is necessary to refer to the L-SPC (A) of user host terminal H1' on the calling party (S82 in FIG. 14). The reason for the necessity of the L-SPC (A) is because, in the initial condition, the L-SPC (A) is not existent in the service execution unit SN3 located in domain D3 to which user host terminal H1' of interest has moved.

Here, user host terminal H1' is accommodated in domain D3, which is different from domain D1. However, because service execution unit SN3 provides the service in the same domain D3, the L-SPC (A) is referred to, instead of the G-SPC (A).

As a result of this decision, service execution unit SN3 transmits an L-SPC request message related to the L-SPC (A) of user host terminal H1' (H1) to authentication server A3 in domain D3 (broken line with arrow (3) in FIG. 13).

On receipt of the L-SPC request message from service execution unit SN3, authentication server A3 detects from the message content that user host terminal H1' (H1) is accommodated in authentication server A1, and transfers the received L-SPC request message to authentication server A1 located in domain D1 (broken line with arrow (3) in FIG. 13).

Authentication server A1 then receives the L-SPC request message, extracts the L-SPC (A) related to user host terminal H1 from the database, and transmits the extracted L-SPC (A) back to service execution unit SN3 having originated the request by use of an L-SPC response message. The L-SPC response message is transmitted to service execution unit SN3 through authentication server A3 (broken line with arrow (4) in FIG. 13).

Service execution unit SN3 extracts the L-SPC related to user host terminal H1 out of the L-SPC response message received from authentication server A3, and stores the extracted L-SPC into the SPC management table owned by service execution unit SN3. Further, service execution unit SN3 initializes the service execution function according to the description content in the acquired L-SPC (S86 in FIG. 14).

Triggered by the L-SPC (A) set in service execution unit SN3, service execution unit SN3 transfers the SIP-Invite message to the destined user host terminal H3.

Service execution unit SN3 then waits for a response from user host terminal H3 (an off hook operation of the telephone terminal). During this period, service execution unit SN3 provides a service according to the L-SPC (A) content to user host terminal H1' (broken line with arrow (5)). For example, an advertisement, or the like, is provided to user host terminal H1' by means of an appropriate message.

By operating the terminal unit, the user of user host terminal H3 responds to the connection request transmitted from user host terminal H1'. As a result of this operation, user host terminal H3 transmits an SIP-Ack (acknowledgement) message, as a response to user host terminal H1'.

The SIP-Ack message transmitted by user host terminal H3 is forwarded to user host terminal H1' through service execution unit SN3.

When user host terminal H1' receives the SIP-Ack message from user host terminal H3, the session between user host terminal H1' and user host terminal H3 is established. Thereafter, voice packets are interchanged bi-directionally between user host terminals H1', H3.

Additionally, in FIG. 13, an L-SPC (D) is the L-SPC of the user host terminal H3.

(4) Operation Example 4

Operation example 4 denotes an example of the execution procedure of the SPC distribution and the individual service control triggered by the application authentication, when a user host terminal of the service contract user moved out of the home link into another link and stays there, and a user host terminal of another service contract user on the opposite party and a service execution unit are located in an external link.

Figure 15:
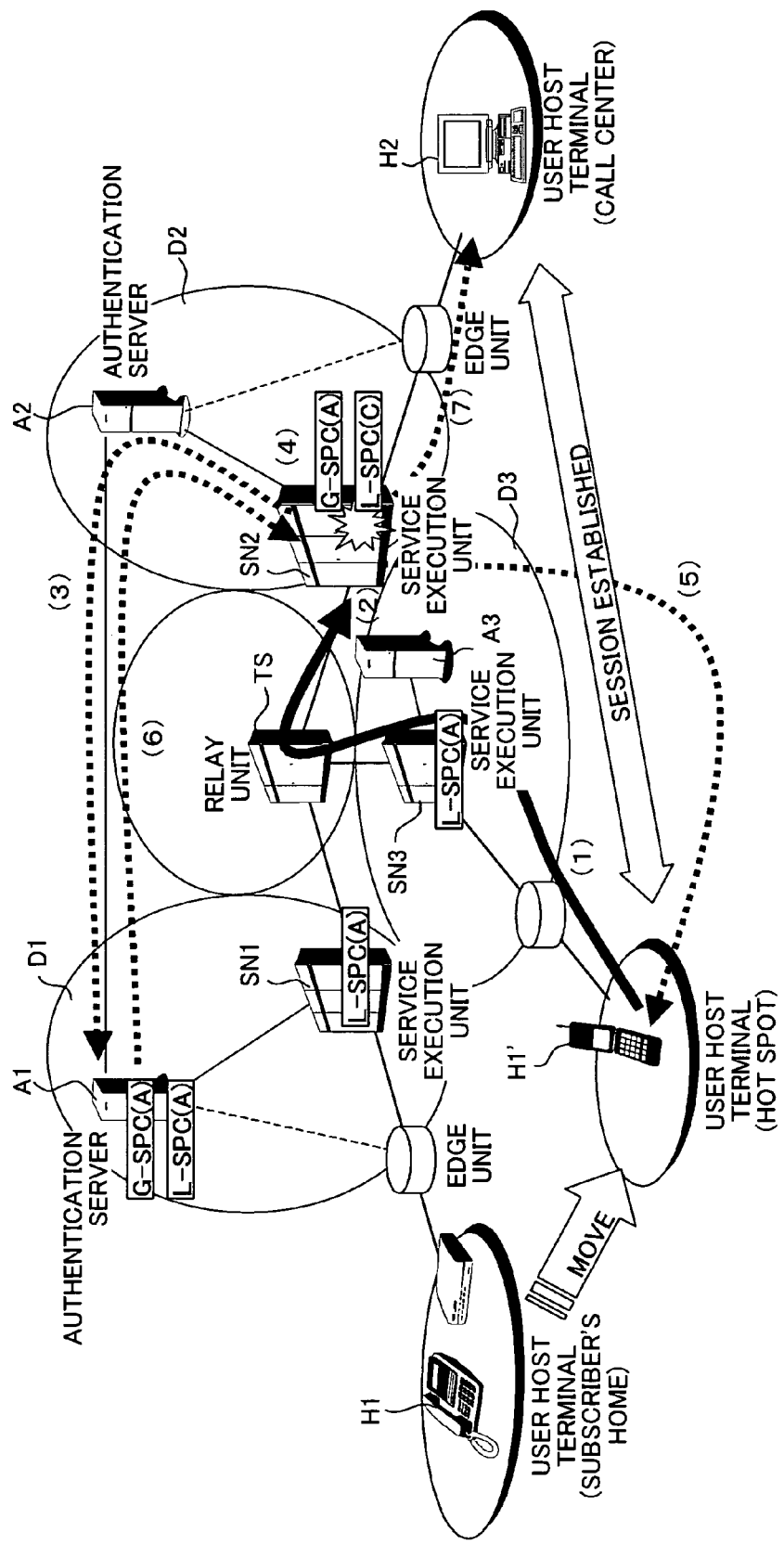
FIG. 15 shows a block diagram illustrating a configuration example of a service control network system in operation example 4.
Figure 16:
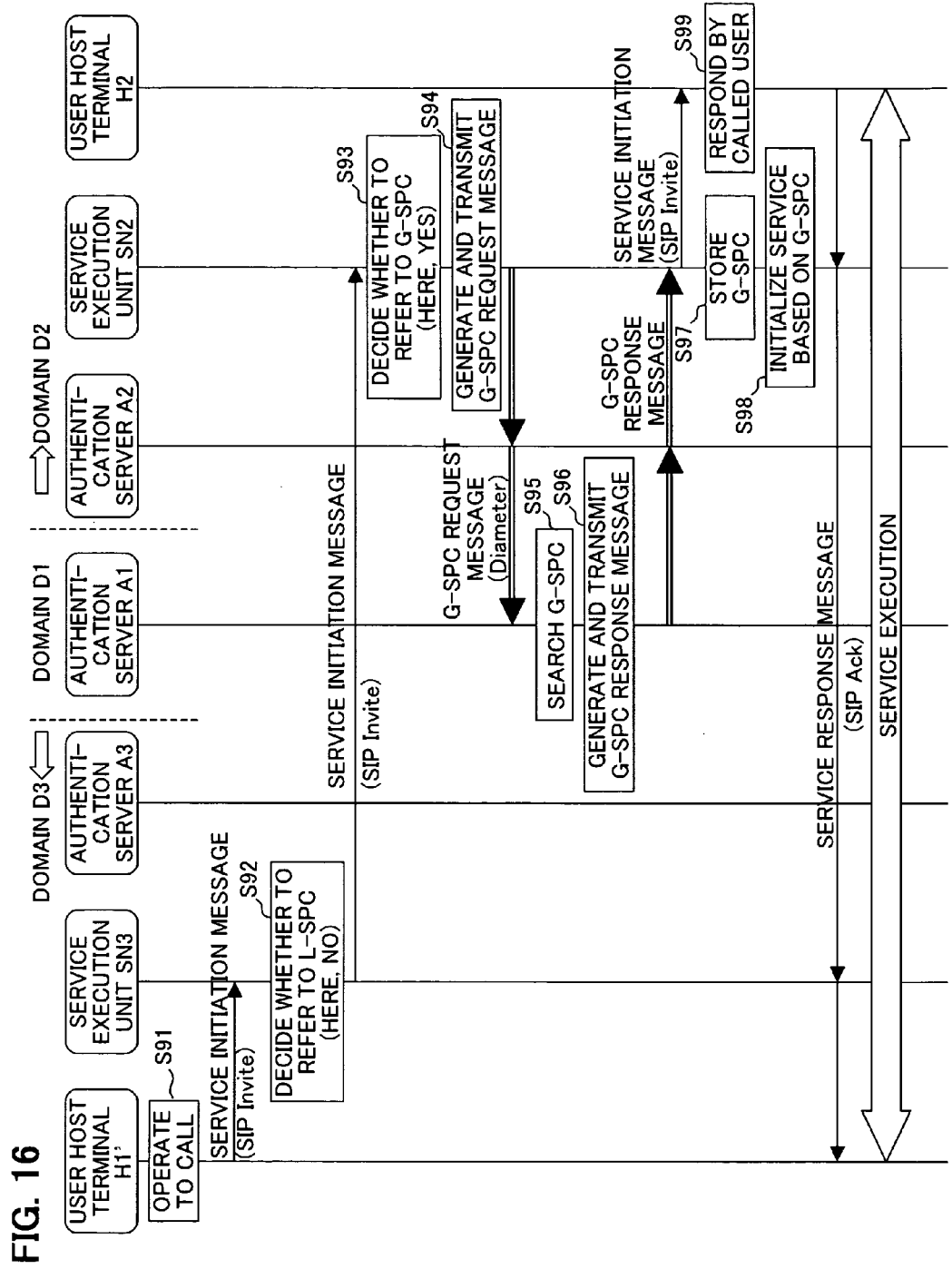
FIG. 16 shows a sequence diagram illustrating the processing flow of a service control network system in operation example 4.

FIG. 15 shows a block diagram illustrating a configuration example of the service control network system in this case. FIG. 16 shows a sequence diagram illustrating a processing flow of the service control network system in this case.

In FIG. 15, during the situation that the service contract user of user host terminal H1 moved out of the home link (domain D1) and stays in another link (domain D4), communication is performed with the opposite user host terminal H2 located in the external domain D2, and also service execution unit SN2 executes the service. The configuration shown in FIG. 15 resembles the configuration shown in FIG. 13. The difference between the configurations in FIGS. 15 and 13 lies in that, in FIG. 15, the party called by user host terminal H1 is user host terminal H2 (call center) located in the other domain D2. (In FIG. 13, user host terminal H1' and the called user host terminal H3 are existent in the same domain.)

First, the user (service contract user) of user host terminal H1' operates the IP telephone function of the terminal to originate a call by designating the opposite party for communication (i.e. user host terminal H2) (S91 in FIG. 16).

Initiated by the user's dial operation, user host terminal H1' generates a service initiation message (SIP-Invite message) designating the opposite user host terminal H2, and transmits the generated service initiation message to the nearest service execution unit SN3 (SIP server) (solid line with arrow (1) in FIG. 15, and S91 in FIG. 16). User host terminal H1' recognizes the location of the nearest SIP server in advance, and thereby the service initiation message is transmitted to service execution unit SN3.

The SIP-Invite message transmitted from user host terminal H1' is received in service execution unit SN3. When executing the service concerned (generation of VoIP session), service execution unit SN3 decides whether it is necessary to refer to the L-SPC (A) of the calling user host terminal H1' (S92 in FIG. 16). Here, in the following description, it is assumed that the L-SPC (A) is already retained in service execution unit SN3, and therefore it is decided that the further reference is unnecessary. Accordingly, the processing of a reference request for the L-SPC (A) to authentication server A1 is omitted.

Service execution unit SN3 transfers an SIP-Invite message to service execution unit SN2 of the called user host terminal H2 through relay unit TS (solid line with arrow (1) in FIG. 15).

On receipt of the SIP-Invite message, service execution unit SN2 detects the service initiation, and also recognizes that user host terminal H1' is managed by domain D1 located outside domain D2. Service execution unit SN2 then decides whether the G-SPC of user host terminal H1' (G-SPC (A)) is to be referred to (symbol (2) in FIG. 15, and S93 in FIG. 16). Here, in the following description, it is assumed that the reference is decided necessary.

Based on this decision, service execution unit SN2 generates a G-SPC request message for requesting for the G-SPC (A), and transmits the generated request message to authentication server A2 located in domain D2 of service execution unit SN2 (broken line with arrow (3) in FIG. 15, and S94 in FIG. 16). This G-SPC request message can also be transmitted by use of a Diameter message.

From the content of the G-SPC request message, authentication server A2 recognizes this message to be transferred to authentication server A1, and transfers this message accordingly.

On receipt of the G-SPC request message, authentication server A1 searches and extracts the G-SPC (A), and transmits the extracted G-SPC (A) to service execution unit SN2 through authentication server A2, using a G-SPC response message (broken line with arrow (6) in FIG. 15, and S96 in FIG. 16).

Authentication server A2 acquires the G-SPC (A), and stores the G-SPC (A) (S97 in FIG. 16). Authentication server A2 then provides a service (for example, transmitting an advertisement message to the calling user host terminal H1', etc.) according to the G-SPC (A) contents. Also, authentication server A2 transfers the service initiation message to user host terminal H2, and waits for response from user host terminal H2.

By operating the terminal unit, the user of user host terminal H2 replies to the connection request from user host terminal H1'. Initiated by this operation, user host terminal H2 transmits an SIP-Ack (acknowledgement) message to reply to user host terminal H1'.

The SIP-Ack message transmitted by user host terminal H2 is forwarded to user host terminal H1' through service execution unit SN2.

When user host terminal H1' receives the SIP-Ack message from user host terminal H2, the session between user host terminal H1' and user host terminal H2 is established. Thereafter, voice packets are interchanged bi-directionally between user host terminals H1', H3.

Additionally, in FIG. 15, an L-SPC (C) is the L-SPC of user host terminal H2.

As can be understood from the above description, according to the embodiment of the present invention, the SPC (L-SPC or G-SPC) specifying the user-independent service contents is given to a service execution unit, instead of an edge unit. Thus, with regard to a layer higher services than the layer three services, it becomes possible to provide individual services for each user.

To summarize, according to the present invention, it becomes possible to provide a service customized for each user and for each application.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A service control network system comprising:
a service execution unit providing a service to a terminal unit; and
a server managing service information specifying the service to be provided to the terminal unit,
said service execution unit further comprising:
a request transmission section transmitting to the server a reference request for the service information corresponding to either a service initiation request or a registration request, on receipt of said service initiation request or said registration request from the terminal unit; and
a service provision section providing the service to the terminal unit based on the service information referred to due to the reference request transmitted from the request transmission section,
and said server comprising:
a service information transmission section transmitting to the service execution unit the service information corresponding to the reference request transmitted from the service execution unit
wherein said service control network system is divided into at least a first domain accommodating the server and the terminal unit, and a second domain,
the service information includes first service information LSPC (Local Service Profile Cache) which is referred to in the case the service execution unit is accommodated in the first domain, or in the case the service execution unit is accommodated in the second domain and the terminal unit moved into the second domain, and second service information G-SPC (Global Service Profile Cache) which is referred to in the case the service execution unit is accommodated in the second domain and the terminal unit is either accommodated in the first domain or moved into a domain other than the first domain or the second domain.

2. The service control network system according to claim 1,
wherein
the request transmission section in the service execution unit transmits either a reference request for the first service information L-SPC either when said service execution unit is accommodated in the first domain or when said service execution unit is accommodated in the second domain and the terminal unit moved into the second domain, or a reference request for the second service information when said service execution unit is accommodated in the second domain and the terminal unit is accommodated in the first domain or moved to the domain other than the first domain or the second domain.

3. The service control network system according to claim 2,
wherein, in the second domain, a second server having a relation of trust with the server is accommodated, and
when the service execution unit is accommodated in the second domain, the request transmission section transmits the reference request to the second server, and the second server transfers the reference request to said server.

4. A service control network system according to claim 1 including a first domain, a first server accommodated in said first domain, a first service execution unit, and a terminal unit, wherein
said first server comprises:
a storage section storing first service information L-SPC specifying a service to be provided to the terminal unit; and
a service information transmission section transmitting the first service information L-SPC stored in the storage section to the first service execution unit, based on a reference request for the first service information L-SPC, on receipt of said reference request from the first service execution unit,
and said first service execution unit comprises:
a first request transmission section transmitting the reference request for the first service information L-SPC corresponding to a service initiation request or a registration request to the first server, on receipt of said service initiation request or said registration request from the terminal unit; and
a first service provision section providing the service to the terminal unit based on the first service information L-SPC referred to due to the request transmitted from the first request transmission section.

5. The service control network system according to claim 4, further including a second domain, and a second server and a second service execution unit respectively accommodated in said second domain,
wherein the storage section further stores second service information G-SPC specifying the service to be provided to the terminal unit, and the service information transmission section transmits the second service information stored in the storage section to the second server based on a reference request for the second service information G-SPC, on receipt of said reference request from the second server,
the second service execution unit comprises:
a second request transmission section transmitting to the second server the reference request for the second service information G-SPC corresponding to a service initiation request, on receipt of said service initiation request from the terminal unit; and
a second service provision section providing the service to the terminal unit based on the second service information G-SPC referred to due to the request transmitted from the second request transmission section, and
the second server comprises:
a transfer section transferring to the first server the reference request transmitted from the second request transmission section, and also transferring to the second service execution unit the second service information G-SPC transmitted from the first server.

6. A service control network system according to claim 1, including a first domain accommodating a first server and a terminal unit, and a second domain, to which the terminal unit moves, accommodating a second server and a second service execution unit,
wherein said first server comprises:
a storage section storing first service information L-SPC specifying a service to be provided to the terminal unit; and
a service information transmission section transmitting the first service information L-SPC stored in the storage section to the second server based on a reference request for the first service information L-SPC, on receipt of said reference request from the second server,
said second service execution unit comprises:
a second request transmission section transmitting to the second server the reference request for the first service information L-SPC corresponding to a service initiation request or a registration request, on receipt of said service initiation request or said registration request from the terminal unit; and
a second service provision section providing the service to the terminal unit based on the first service information L-SPC referred to due to the request transmitted from the second request transmission section, and
said second server comprises:
a transfer section transferring to the first server the reference request transmitted from the second request transmission section, and transferring to the second service execution unit the first service information L-SPC transmitted from the first server.

7. The service control network system according to claim 6,
wherein, there are multiple second domains, and multiple server and execution units in the second domains.

* * * * *